US009641369B2

(12) United States Patent
Tyrrell

(10) Patent No.: US 9,641,369 B2
(45) Date of Patent: May 2, 2017

(54) CIRCUITS AND METHODS FOR DECODING AMPLITUDE MODULATED DATA SIGNALS FROM LARGE AMPLITUDE SINE WAVE CARRIER

(71) Applicant: Dialog Semiconductor (UK) Limited, Reading (GB)

(72) Inventor: Julian Tyrrell, Cricklade (GB)

(73) Assignee: Dialog Semiconductor (UK) Limited, Reading (GB)

( * ) Notice: Subject to any disclaimer, the term of this patent is extended or adjusted under 35 U.S.C. 154(b) by 38 days.

(21) Appl. No.: 14/723,687

(22) Filed: May 28, 2015

(65) Prior Publication Data

US 2015/0349993 A1     Dec. 3, 2015

Related U.S. Application Data

(60) Provisional application No. 62/004,263, filed on May 29, 2014.

(30) Foreign Application Priority Data

Aug. 4, 2014   (DE) .......................... 10 2014 215 343

(51) Int. Cl.
*H04L 27/06*     (2006.01)
*H04L 27/233*     (2006.01)
(Continued)

(52) U.S. Cl.
CPC .......... *H04L 27/2337* (2013.01); *H04L 27/06* (2013.01); *H05B 33/0845* (2013.01); *H05B 37/0263* (2013.01)

(58) Field of Classification Search
CPC . H04L 27/2337; H04L 27/06; H05B 37/0263; H05B 33/0845
See application file for complete search history.

(56) References Cited

U.S. PATENT DOCUMENTS 5,317,215 A    5/1994   Kranzler
5,333,153 A *   7/1994   Brown ................ H04B 1/1027
                                                                   375/346
(Continued)

FOREIGN PATENT DOCUMENTS

DE    10 2009 051 968      5/2011
DE    10 2012 215 505      3/2014

OTHER PUBLICATIONS

German Office Action and US Translation 10 2014 215 341.7, Feb. 19, 2015, Dialog Semiconductor GmbH.

(Continued)

*Primary Examiner* — Jean B Corrielus
(74) *Attorney, Agent, or Firm* — Saile Ackerman LLC; Stephen B. Ackerman; Billy Knowles

(57) ABSTRACT

A digital load side transmission lighting control apparatus has at one least control gear for controlling at least one lighting source. The control gear includes a period timer to establish an inter-transition time period between each transition within each data packet frame. An inter-transition comparator is in communication with the period timer and configured to compare each of the inter-transition periods with valid inter-transition periods between each transition of the bi-phase encoded data for determining if the inter-transition periods represent valid patterns or are an error has occurred. A data extractor is configured to receive valid bi-phase encoded data from the inter-transition comparator for extracting transmitted data from within the data packet frames. A command formatter is configured to receive the extracted frame data from the data extractor for assembling the telegram bit data pattern for transfer for the subsequent processing.

34 Claims, 15 Drawing Sheets

(51) Int. Cl.
*H05B 33/08* (2006.01)
*H05B 37/02* (2006.01)

(56) References Cited

U.S. PATENT DOCUMENTS

| | | | | |
|---|---|---|---|---|
| 5,598,431 | A | * | 1/1997 | Lobel .................... H03G 3/344 370/252 |
| 5,671,258 | A | * | 9/1997 | Burns ................... H04L 7/0337 327/165 |
| 6,278,357 | B1 | | 8/2001 | Croushore et al. |
| 6,424,250 | B1 | | 7/2002 | Puckette, IV et al. |
| 6,476,709 | B1 | | 11/2002 | Wuidart et al. |
| 7,543,193 | B2 | * | 6/2009 | Barrett .................. H04J 3/0608 370/907 |
| 2010/0019889 | A1 | | 1/2010 | Braunshtein |
| 2013/0003900 | A1 | | 1/2013 | Wang et al. |
| 2013/0080092 | A1 | | 3/2013 | Yogeeswaran et al. |

OTHER PUBLICATIONS

German Office Action and US Translation 10 2014 215 342.5, Feb. 18, 2015, Dialog Semiconductor GmbH.
German Office Action and US Translation 10 2014 215 343.3, Feb. 27, 2015, Dialog Semiconductor GmbH.
"A Comparison of Receiver Topologies for Digital Load-Side Transmission in General LED Lighting," by Lukas Lohaus et al., 2014 18th International Symposium on Power Line Communications and Its Applicaitons, Mar. 30, 2014, pp. 249-254.
"Zero Crossing Determination by Linear Interpolation of Sampled Sinusoidal Signals," by Gerson Eduardo et al., 2004 IEEE/PES Transmisison & Distribution Conference & Exposition: Latin America, Nov. 8, 2004. pp. 799-802.
IEC 62756 Digital Load Side Transmission Lighting Control (DLT)—Part 1: Basic Requirements, Jan. 1, 2012, pp. 1-51.

* cited by examiner

| FRAME START OF TELEGRAM | DATA FRAME 1 | DATA FRAME 2 | DATA FRAME 3 |
|---|---|---|---|
| | $g1, g2$ | $0, 0$ | $0, p$ |
| DATA FRAME 4 | DATA FRAME 5 | ... ... | DATA FRAME $n$ |
| $b1, b2$ | $b3, b4$ | ... ... | $bn1, bn$ |

$g$ = GROUP NUMBER (0-3); $g1$ = MSB
$p$ = PARITY
$b$ = DATA PAYLOAD (0-$2^n$); $b1$ = MSB

*FIG. 8*

CIRCUITS AND METHODS FOR DECODING AMPLITUDE MODULATED DATA SIGNALS FROM LARGE AMPLITUDE SINE WAVE CARRIER

TECHNICAL FIELD

This disclosure relates generally to demodulation and reconstructing of an originating signal that is amplitude modulated on a carrier signal. More particularly, this invention relates to the extraction of a high frequency, digital data signal from a lower frequency, large amplitude carrier signal such a power line.

BACKGROUND

Transmission of small amplitude digital data signals superimposed upon a larger lower frequency carrier signal is known in the art. In applications such as control of electrical gear connected to utility power supply mains, a control device generates control signals that are coupled to the power supply mains for transmission to the electrical gear for controlling the operating conditions of the electrical gear. For lighting applications, light emitting diodes are emerging as a technology that provides energy efficiency, consistent light quality, and control functionality such as dimming, balancing and accurate color mixing.

IEC 62756—Digital Load Side Transmission Lighting Control (DLT) published by the International Electrotechnical Commission, Geneva, Switzerland defines a protocol for simple control of brightness, color, color temperature, and other parameters for the purpose of controlling lighting sources such as Compact self-ballasted Fluorescent Lamps (CFLi), LED light engines, electronic control gear, and any other light source with integrated or external control gear.

FIG. 1 is a block diagram of a lighting system with one control device and at least one control gear of the related art. The power supply mains 5 have a line side or supply side L and a neutral or return line N. The line side L is connected to the control device 10 and the neutral line N is connected to the control device 10 and the control gear 15a . . . 15n. The control device voltage drop $V_{CG}$ is the voltage between the line side L and load side terminal 20 of the control device. The control device current $I_{CD}$ is the current through the load side terminal 20 of the control device. The control gear voltage $V_{CG}$ is the voltage between the pairs of the input terminals 16a . . . 16n, 17a . . . 17n of the control gear 15a . . . 15n. The control gear current $I_{CG}$ is the current through the input terminals 16a . . . 16n of the control gear 15a . . . 15n that is used to modify and maintain the operation of the control gear 15a . . . 15n. The control gear 15a . . . 15n operates in slave mode only and consequently receives information only. The control device 10 operates in master mode only and consequently transmits information only. It should be noted that bi-directional communication is not restricted from the operation of the control device 10 and the control gear 15a . . . 15n. The control data is transmitted from the control device 10 to the control gear 15a . . . 15n as a bi-phase coding or Manchester coding with error detection. The effective transmission rate of the control data is 200 bit/sec at 50 Hz and 240 bit/sec at 60 Hz. The control device 10 and the control gear 15a . . . 15n are compatible with power supply mains 5 voltage that is from approximately 100 V to 347 V. While other structures are possible the specification as written is defined to supply power to two-wire control devices.

FIG. 2 is a block diagram of a control gear 15a . . . 15n of the related art as shown in FIG. 1. The line side L and a neutral N of the power supply mains 5 are connected to a rectifier unit 25 for rectifying the power supply mains 5 voltage. A bypass circuit 30 is connected to the rectifier unit 25 and is designed to carry specified currents as defined for different periods. Connected in parallel with the bypass circuit 30 is a decoupling circuit 35 that decouples the transmitted data from the power supply mains 5 and forwards the transmitted data signal to a processing unit 40. The processing unit 40 acts on the received data information to drive a lamp controller 50. The lamp controller 50 supplies light emitting elements 55 with the necessary currents and voltages for determining the brightness, color, color temperature, such as low pressure discharge lamps ☐ or LEDs. A decoupling diode 45 is optionally included in the control gear 15a . . . 15n, if the input capacitance of the lamp controller 50 would disturb the reception of the transmission signal.

FIG. 3 is a plot of a half sine wave at the input of the control gear 15a . . . 15n showing the specified periods of the related art. The half sine wave shown has a period that is one half the period of the power supply mains 5 voltage of 50 Hz or 60 Hz. For the function of the control device 10 to the control gear 15a . . . 15n of FIG. 1, the half sine wave is divided into three periods—the supply period, the operating period, and the data period. In the supply period, power is supplied to a control device 10. In the operating period, power is supplied to a control gear 15a . . . 15n. In the data period, the data is transmitted from the control device 10 to the control gear 15a . . . 15n. The supply period lasts from the zero crossing that begins the half sine wave cycle until the power supply mains 5 voltage achieves a voltage level $V_{SW}$ of 60V−0V/+10V for power supply mains 5 voltage that is from 100V to 120V at the time $t_4$. The supply period lasts from the zero crossing time $t_{ZC1}$ that begins the half sine wave cycle until the power supply mains 5 voltage achieves a voltage level $V_{SW}$ of 120V−0V/+15V for power supply mains 5 voltage that is from 200V to 277V at the time $t_4$. The supply period lasts from the zero crossing that begins the half sine wave cycle until the power supply mains 5 voltage achieves the voltage level $V_{SW}$ of 175V−0V/+15V for power supply mains 5 voltage that is approximately 347V at the time $t_4$. This period is approximately 1200 μsec.

The operating period is the time that the power supply mains 5 voltage is greater that the voltage level $V_{SW}$ between the time at the time $t_4$ and the time at the time $t_6$. This period is approximately 7600 μsec. The data period is the time after the operating period that the power supply mains 5 voltage is less than the voltage level $V_{SW}$ and is approximately 1200 μsec from the period $t_6$ to the zero crossing time $t_{ZC2}$ that is the beginning of the next cycle of the half sine wave.

FIG. 4 is a plot of the voltage and current at the input of the control gear during a data time period of the half sine wave of FIG. 3. When the power supply mains 5 voltage is less than the voltage level $V_{SW}$, the data period begins at the time $t_6$. The current $I_{CG\_LC}$ is the current-carrying capability of the control gear 15a . . . 15n during the data period from the time $t_6$ to the zero crossing time $t_{zc2}$. FIG. 5 is a plot of a Manchester encoded data packet frame prior to modulation of the half sine wave to be applied to the input of the control gear 15a . . . 15n during the data time period. The voltage $V_{CDmin}$ is the voltage level between the line side L and load side terminals 20 of the control device 10 when its impedance $Z_{CD}$ is minimal. The voltage $V_{DATA}$ is the signal amplitude of the transmission signal and is the difference of the voltage between the line side L of the power supply mains 5 and load side terminals 20 of the control device 10 between logical states. The amplitude of the data signal is 7.5V+/−0.5V for power supply mains 5 voltage level of 100V and 120V and 15.0V+/−1.0V for power supply mains 5 voltage level of 230V.

FIG. 6 is a plot of a data packet frame modulating the half sine wave of FIG. 3. As described above the data period begins when the power supply mains 5 voltage $V_{MAINS}$ is lower than the voltage level $V_{SW}$ at the time $t_6$. The data packet frame modulated on the power supply mains 5 voltage $V_{MAINS}$ is specified as being present any time between the time $t_7$ and the time $t_8$. The time $t_7$ is specified as being 800 μsec prior to the next zero crossing time $t_{zc2}$ and the time $t_8$ is specified as being from approximately 250 μsec to time of the next zero crossing $t_{ZC}$. The data packet frame consists of six half-bits that are each 50 μsec+/−7.5 μsec such that the total message length is 300 μsec. The decoupling circuit 35 must be able to detect the presence of the data within time between the time $t_7$ and the time $t_8$ and extract the data packet frame correctly. A data message or telegram is composed of eight data packet frames. FIGS. 7a-7f are plots of the five types of data packet frames illustrating the Manchester coding of the data packet frames of the data of the related art. In FIG. 7a, the data packet frame begins with a start half-bit that is set to a digital "1". The next four half-bits are the digital "1's" and "0"s" that define two data bits in a Manchester coding. Each data packet frame is terminated with the last half-bit set to the digital "0". In FIG. 7b, the first data packet frame of a telegram is a "start-of-telegram" frame and the entire frame is to all "1". The next six data packet frames provide the data and parity that is interpreted as data for controlling the light emitting elements 55 of FIG. 3. The Manchester code is a bi-phase encoding where each data bit has at least one transition during a bit period. In this implementation of the Manchester coding the digital "0" is has a first half bit of a digital "1" and a second half bit of a digital "0". The digital "1" has a first half-bit of a digital "0" and a second half-bit of a digital "1". FIG. 7c illustrates a data packet frame of a digital "0, 0", FIG. 7d illustrates a data packet frame of a digital "0, 1", FIG. 7e illustrates a data packet frame of a digital "1, 0", and FIG. 7f illustrates a data packet frame of a digital "1, 1".

FIG. 8 is a table describing the structure of a telegram formed from multiple data packet frames of the related art. The first data packet frame of a telegram is a "start-of-telegram" frame as shown in FIG. 7b. All subsequent data packet frames of the telegram shall be payload data. Every data packet frame transmission shall start with the most significant bit (MSB) and with each following data packet frame having decreasing significance and shall end with the least significant bit. This structure is valid within every data packet frame and for every part of the telegram with identical type of information. Following the "start-of-telegram" frame, data frames shall be transmitted containing group number in the first data frame. The second data frame contains the first two most significant bits of the telegram type. The first bit of the third data packet frame has the third data bit of the telegram type and a parity bit is the second bit of the third data frame. The remaining data packet frames have the payload data needed to control the control gear 15a, . . . , 15n of FIG. 1 in accordance with the telegram type.

In the first data frame, the control gear 15a, . . . , 15n that do not support group numbers shall react to group number "0" indicating that the commands are broadcast to all control gear 15a, . . . , 15n being controlled by the control device 10. Each control gear 15a, . . . , 15n shall analyze the telegram for framing errors and parity errors, and length error. The parity will determine an error based upon the analysis of the control gear 15a, . . . , 15n and if an error is detected or a telegram is received incompletely or incorrectly, the control gear 15a, . . . , 15n shall ignore the entire telegram and wait for the transmission of the next telegram. The control device 10 transmits the telegrams continuously and may abort a transmission of the telegram and start a new transmission at the next data period of the power supply mains 5.

SUMMARY

An object of this disclosure is to provide a circuit and method for decoding encoded digital data extracted from a low frequency, large amplitude carrier signal that is amplitude modulated with the higher frequency, encoded digital data.

Another object of this disclosure it to provide a circuit or method for decoding of data packet frames of a telegram encoded with control information amplitude modulated on a large amplitude carrier signal, such as AC mains power supply.

Still another object of this disclosure is to provide a circuit and method for decoding a higher frequency, small amplitude signal from a lower frequency, large amplitude carrier where the circuit and method are tolerant of a widely specified time period between transitions of digital data of the small amplitude signal.

To accomplish at least one of these objects a decoding apparatus determines a telegram bit data pattern from multiple data packet frames containing bi-phase encoded data to generate the telegram bit data pattern for subsequent processing. The decoding apparatus includes a period timer to establish an inter-transition time period between each transition within each data packet frame. The inter-transition time period is the time between each transition of the bi-phase encoded data between a first data level to a second level and between the second data level and the first data level. An inter-transition comparator compares each of the inter-transition periods with the valid inter-transition periods of each transition of the bi-phase encoded data and determines if they are valid patterns or an error. The valid bi-phase encoded data selected from the comparator is transferred to a command extractor that determines the transmitted data within the data packet frames. The extracted frame data is transferred to a command formatter for assembling the telegram bit data pattern for transfer for the subsequent processing.

In various embodiments, the period timer has a first counter and a second counter. The first and second counters receive a much faster counter clock than the basic frequency of the bi-phase encoded data of the data packet frames such that the counter can determine an accurate representation of the inter-transition periods. The first counter receives the serially extracted data packet frame, detects, and counts the data of the first data level ("1"). The second counter receives the serially extracted data packet frame, detects, and counts the data of the second data level ("0").

Each inter-transition count of the first and second counters is transmitted to the inter-transition comparator to be compared with the maximum and minimum transition counts of a valid data bit pattern to determine the data bit pattern is contained in each of the data packet frames. Each valid data bit pattern has unique the inter-transition time periods that inter-transition comparator employs to determine a bit pattern for each of the data packet frame decoded. The inter-transition comparator is programmed with the maximum and minimum transition counts for each of the valid data bit patterns. If the received inter-transition count falls outside the maximum and minimum transition counts, the inter-transition comparator declares an error and await a new start-of-telegram to resume decoding.

In various embodiments, each of the valid inter-transition count data is transmitted to a data extractor. The data extractor decodes the inter-transition count data to extract the frame data. The extracted frame data is transferred to a command formatter for assembling into a telegram. A first data packet frame of a telegram has a "start-of-telegram" symbol that indicates that a series of data packet frames are being transmitted to communicate the telegram. At reception of the start-of-telegram symbol, the command formatter initializes a telegram register. With the reception of each of the subsequent bit patterns, the data extractor places each of the bit patterns in the telegram register. When the telegram register is loaded, the command formatter determines that there are no framing errors, length errors, or parity errors and then transfer the telegram from the telegram register for subsequent processing.

In various embodiments that accomplish at least one of these objects, a method for determining a telegram bit data pattern from multiple data packet frames containing bi-phase encoded data to generate data for subsequent processing. The method begins with determining that a data transition from a first data level to a second data level and between the second data level and the first data level has arrived. If the quiescent level is the first data level, then the method determines that the data transition is from the first data level to the second data level. The method then determines the inter-transition period between the transition from the first data level to the second data level to the transition from the second data level to the first data level. The subsequent inter-transition periods for each transition of the data packet frame are determined. The inter-transition periods are then compared with the maximum and minimum transition counts to determine the data bit pattern contained in each of the data packet frames. The data bit pattern of data packet frame is placed in a telegram register and the subsequent data packet frames have their inter-transition periods determined and the inter-transition periods are compared with the maximum and minimum transition counts to determine the valid data bit pattern contained in each of the data packet frames. If the data bit patterns are not valid, an error is declared and the method returns to the beginning to receive a next data frame.

When the telegram register is filled, the telegram data resident in the telegram register is then examined to determine that there are no framing errors, length errors, or parity errors. If there are no framing errors, length errors, or parity errors, the data resident in the telegram register is transferred to associated circuitry for execution of the command indicated by the telegram data. If there are framing errors, length errors, or parity errors, the method ceases decoding and awaits the next start-of-telegram data frame.

In various embodiments, at least one of these objects is accomplished by a digital load side transmission lighting control apparatus that has at one least control gear for controlling at least one lighting source. The control gear has a decoding apparatus that determines a telegram bit data pattern from multiple data packet frames containing bi-phase encoded data to generate data for subsequent processing. The decoding apparatus includes a period timer to establish an inter-transition time period between each transition within each data packet frame. The inter-transition time period is the time between each transition of the bi-phase encoded data between a first data level to a second level and between the second data level and the first data level. An inter-transition comparator compares each of the inter-transition periods with the valid inter-transition periods of each transition of the bi-phase encoded data and determines if they are valid patterns or an error. The valid bi-phase encoded data selected from the comparator is transferred to a command extractor that determines the transmitted data within the data packet frames. The extracted frame data is transferred to a command formatter for assembling the telegram bit data pattern for transfer for the subsequent processing.

In various embodiments, the period timer has a first counter and a second counter. The first and second counters receive a much faster counter clock than the basic frequency of the bi-phase encoded data of the data packet frames such the counter can determine an accurate representation of the inter-transition periods. The first counter receives the serially extracted data packet frame, detects, and counts the data of the first data level ("1"). The second counter receives the serially extracted data packet frame, detects, and counts the data of the second data level ("0").

Each inter-transition count of the counter clock is transmitted to the inter-transition comparator to be compared with the maximum and minimum transition counts of the valid data bit patterns to determine the data bit pattern contained in each of the data packet frames. Each valid data bit pattern has unique inter-transition time periods that the inter-transition comparator employs to determine a bit pattern for each of the data packet frame decoded. The inter-transition comparator is programmed with the maximum and minimum transition counts for each of the valid bit patterns. If the received inter-transition count falls outside the maximum and minimum transition counts, the inter-transition comparator declares an error and awaits a new start-of-telegram to resume decoding.

In various embodiments, each of the valid inter-transition data count is transmitted to a data extractor. The data extractor decodes the inter-transition counts to extract the frame data. The extracted frame data is transferred to a command formatter for assembling into a telegram. A first data packet frame of a telegram has a "start-of-telegram" symbol that indicates that a series of data packet frames are being transmitted to communicate the telegram. At reception of the start-of-telegram symbol, the command formatter initializes a telegram register. With the reception of each of the subsequent bit patterns, the data extractor places each of the bit patterns in the telegram register. When the telegram register is loaded, the command formatter determines that there are no framing errors, length errors, or parity errors and then transfer the telegram from the telegram register for subsequent processing.

In other embodiments, at least one of these objects is accomplished by a non-transitory medium that is readable by a computer processor. The non-transitory medium has a program of instructions stored on it that are executable by the computer processor to perform the method for determining a telegram bit data pattern from multiple data packet frames containing bi-phase encoded data to generate data for subsequent processing.

BRIEF DESCRIPTION OF THE DRAWINGS

FIG. 8 is a table describing the structure of a telegram formed from multiple data packet frames of the related art.

DETAILED DESCRIPTION

As described above for FIG. 6, the data packet frame modulated to the sine wave has a fixed packet size of 6 bits and a defined window of transmission on the power supply mains 5 sine waveform. These are defined in detail the IEC 62756 specification, but essentially the data is transmitted between 800 μs and 120 μs before each zero-crossing of the power supply mains 5 cycle. The data window will be lower than the voltage threshold $V_{SW}$ at the time $t_6$. For a 230 $V_{RMS}$ system, the data signal amplitude is 15V peak, with a half-bit width of approximately 42.5 μsec to 57.5 μsec. The voltage threshold $V_{SW}$ at the time $t_6$ is at 120V. For a 120 $V_{RMS}$ system, the data signal amplitude is 15V peak, with a half-bit width of approximately 42.5 μsec to 57.5 μsec. The voltage threshold $V_{SW}$ at the time $t_6$ is at 60V.

Figure 6:
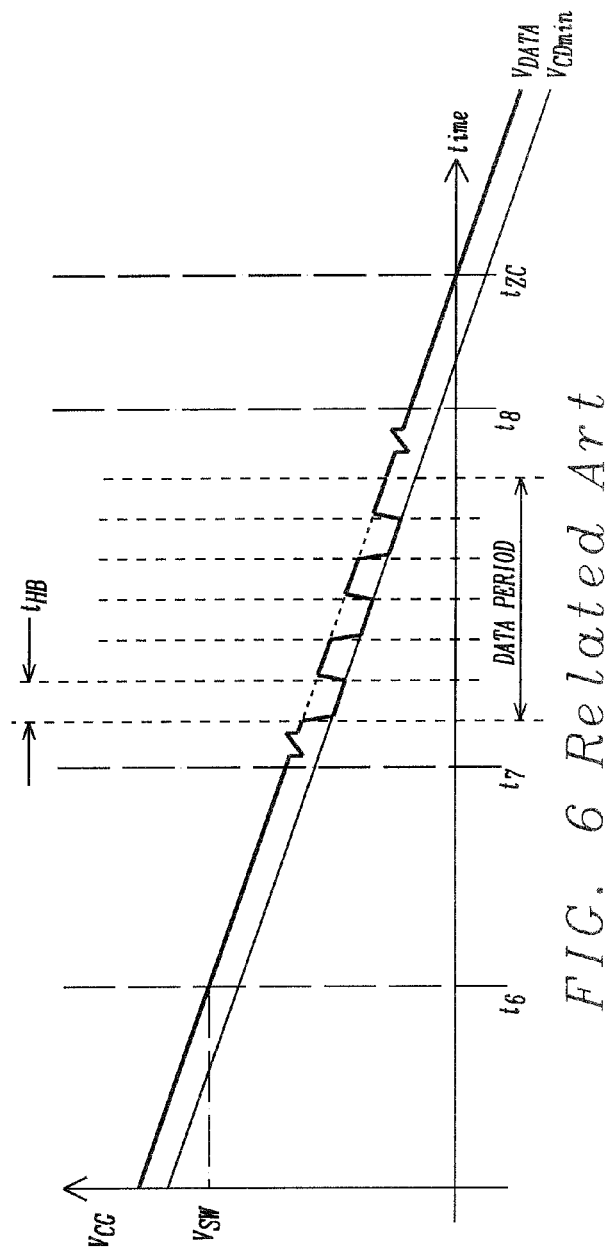
FIG. 6 is a plot of a data packet frame modulated to the half sine wave of FIG. 3.
Figure 7A:
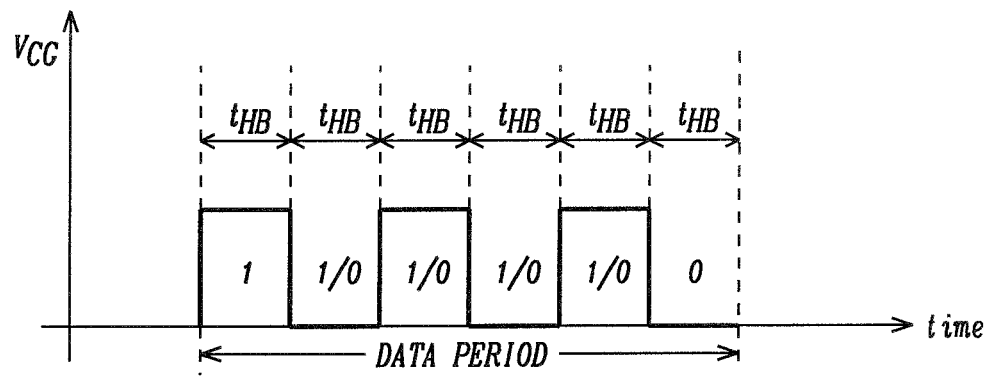
FIGS. 7*a*-7*f* are plots of data packet frames illustrating the Manchester coding of the data packet frames of the data of the related art.
Figure 7B:
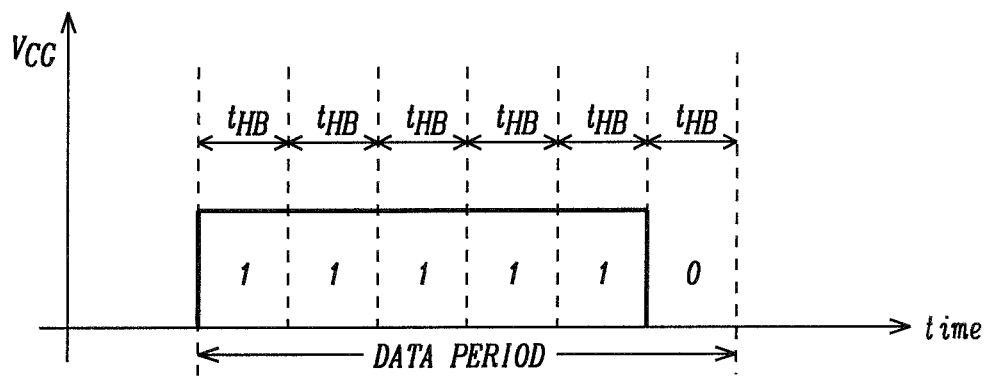
Figure 7C:
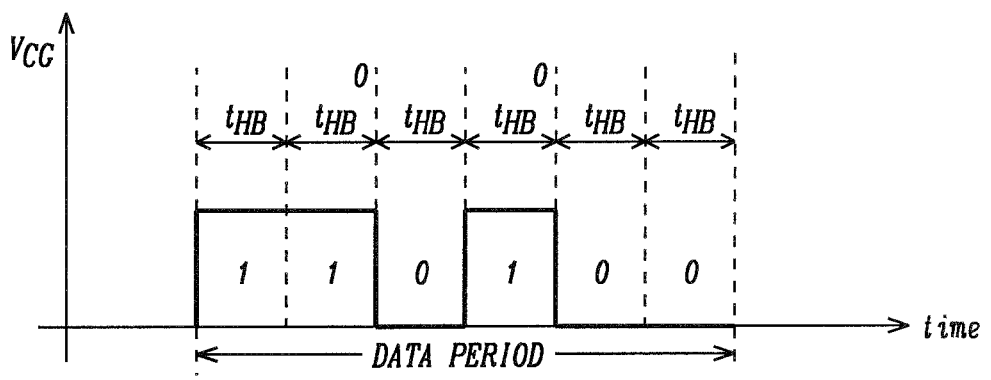
Figure 7D:
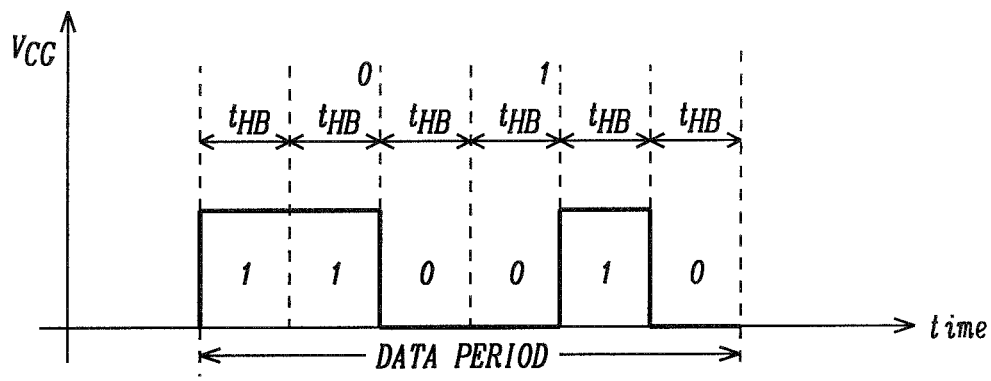
Figure 7E:
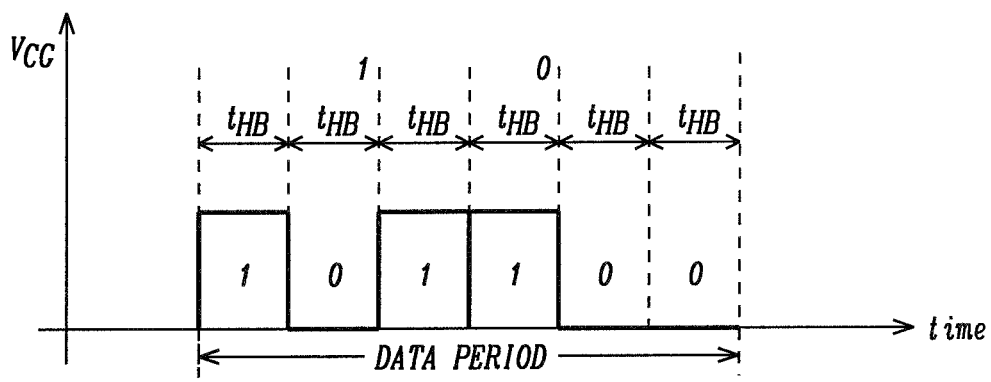
Figure 7F:
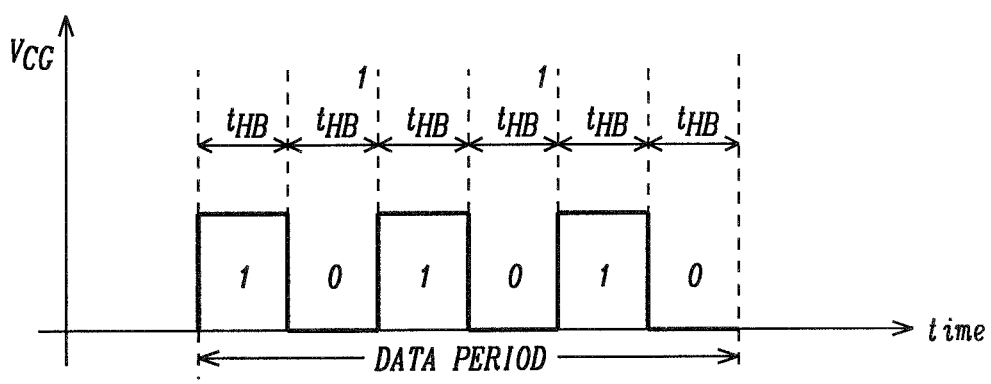

In FIG. 6, the convention is that the voltage level representing the half-bit that is set to a digital "0" is no deviation from the voltage level of the power supply mains 5 and half-bit that is set to a digital "1" is always represented by a voltage level $V_{TS}$ that is from approximately 14.0V to approximately 16.0V (typically 15.0V) less than the voltage level of the power supply mains 5 with a 230 $V_{RMS}$ system and is from approximately 7.0V to approximately 8.0V (typically 7.5V) less than the voltage level of the power supply mains 5 with a 120 $V_{RMS}$ system. The lowest level of the voltage level $V_{TS}$ is the voltage drop $V_{CD}$ across the control device 10 between the line side L and load side terminals 20 of the control device 10.

The IEC 62756 Digital Load Side Transmission Lighting Control specification gives a relatively wide range of both pulse widths and rise/fall times for the small amplitude data signal waveform. The bit pulse width and rise/fall times of the IEC 62756 specification makes the time of a half data bit set at approximately half of the modulation amplitude vary greatly. The resulting binary pattern is difficult to decode as the relative widths of the digital "1" and the digital "0" can be quite different. The minimum and maximum periods for 6-bits is from approximately 255 μsec to approximately 345 μsec. As can be seen, the overall variation of the length of the pattern for the 6-bits from minimum to maximum exceeds the length more than a single bit. This makes a simple pattern matching algorithm difficult to implement.

In order to accommodate the data pattern and variation due to the specification, two devices handle the decoding. The first device is a period timer to determine the width of a digital "1" and a digital "0" by counting the time between transitions as a number of periods of a faster system clock. The second device extracts the data by decoding the transition times based on the timer periods, and follows a pre-determined sequence of steps for each of the possible patterns to determine the valid data patterns. Pulse widths outside the defined range of time periods between the data transitions are treated as error conditions to eliminate false decodes.

Figure 9:
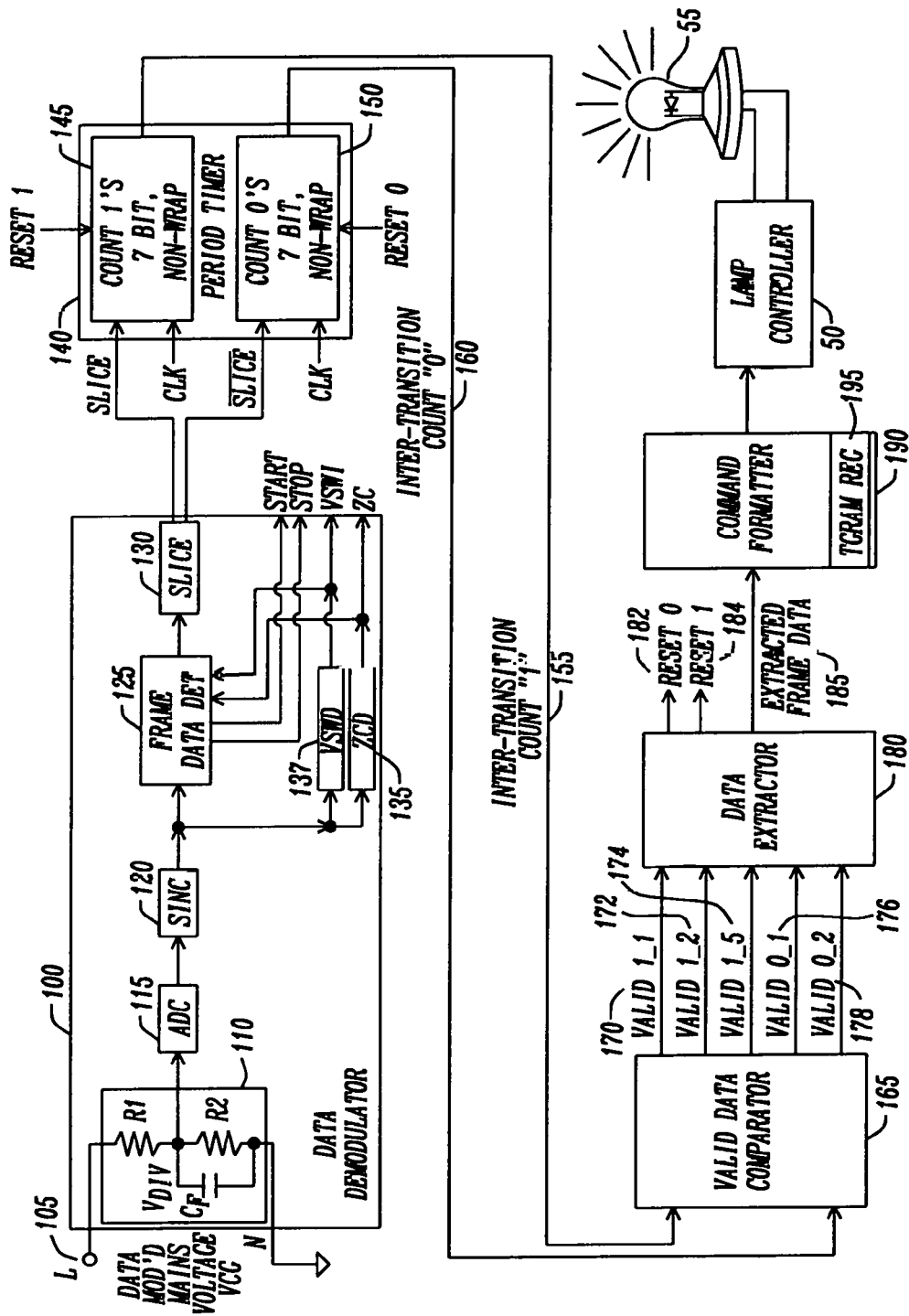
FIG. 9 is a block diagram of a control gear circuit embodying the principals of the present disclosure.

FIG. 9 is a block diagram of a control gear circuit embodying the principals of the present disclosure. The small amplitude data signal of FIG. 6 is modulated on the sine wave of the large amplitude carrier voltage signal $V_{CG}$ of the power supply mains 105 and the modulated sine wave of the large amplitude carrier voltage signal $V_{CG}$ on the power supply mains 105 is the input to the data extraction circuit 100. The line side L of the modulated power supply mains 105 is applied to a first resistor R1 of the voltage divider 110. The neutral side N of the power supply mains 105 is applied to a second resistor R2 of the voltage divider 110. A junction of the resistors R1 and R2 provides an output voltage $V_{DIV}$ that is a fraction of the voltage $V_{CG}$ of the power supply mains 105. A small external capacitor $C_F$ is connected from the junction of the resistors R1 and R2 to the neutral side N of the power supply mains 105 across the resistor R2.

The output voltage $V_{DIV}$ of the voltage divider 110 is the input to an analog to digital converter (ADC) 115. The values of the resistors R1 and R2 are chosen such that the peak voltage of the divided output voltage $V_{DIV}$ is the maximum voltage of the input to the ADC 115 when the voltage $V_{CG}$ of the power supply mains 105 is at its peak. In the areas of the world with a 120V power supply mains, the peak is approximately 170V and in areas of the world with 230V power supply mains, the peak is approximately 325V. If the maximum input voltage level for the ADC 115, is approximately 3V then the values of the resistors R1 and the input potential divider has to have a relatively low power dissipation. The resistor R1 is selected to be in the region of about 1 MΩ. With the resistor R1 being specified as being 1 MΩ, R2 are calculated to be approximately 25 KΩ for the 120V power supply mains and approximately 13 KΩ for the 230V power supply mains.

Figure 1:
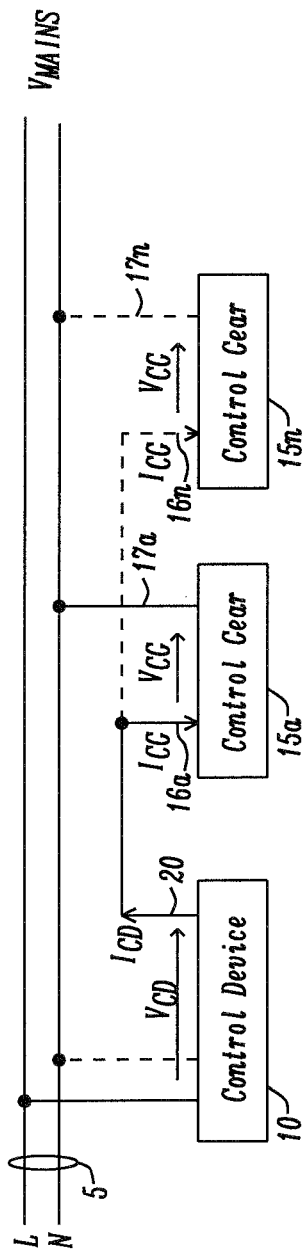
FIG. 1 is a block diagram of a lighting system with one control device and one or two control gear of the related art.
Figure 2:
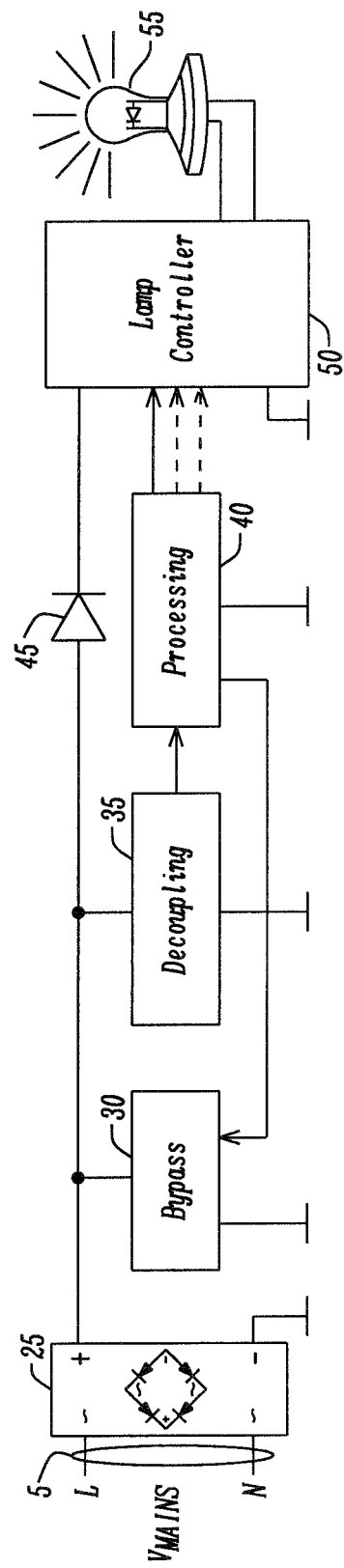
FIG. 2 is a block diagram of a control gear of the related art.
Figure 3:
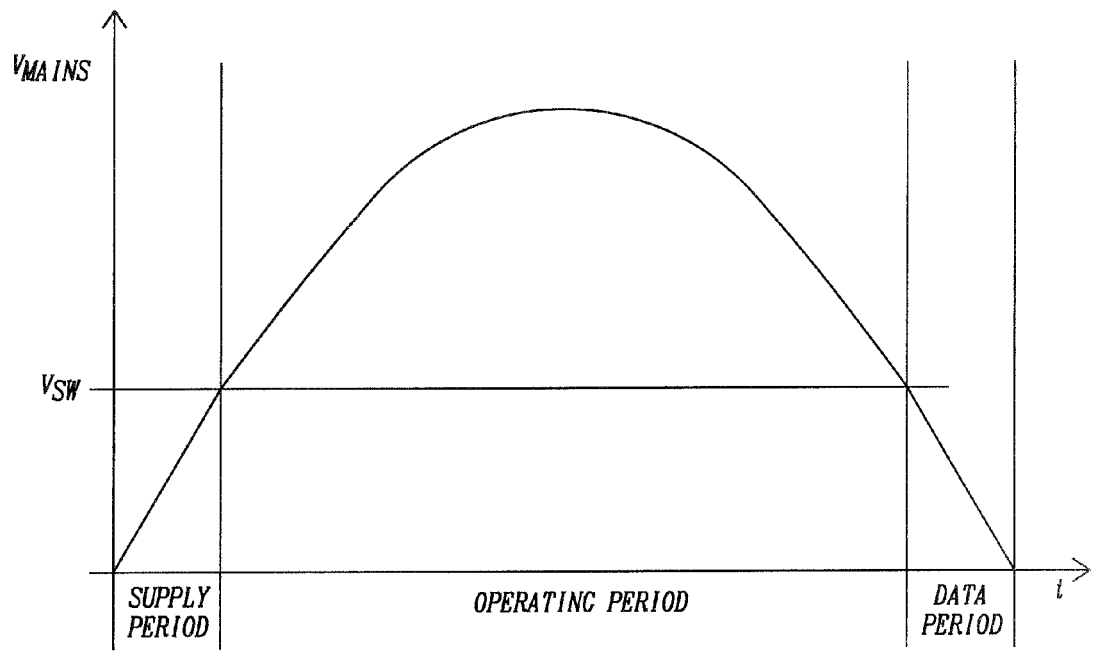
FIG. 3 is a plot of a half sine wave at the input of the control gear showing the specified periods of the related art.
Figure 4:
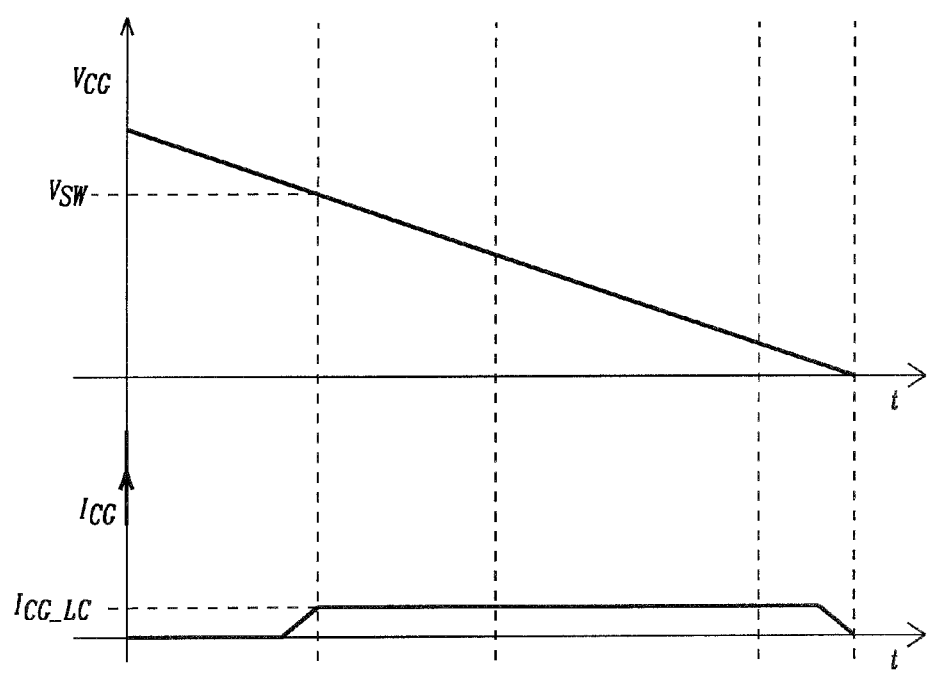
FIG. 4 is a plot of the voltage and current at the input of the control gear during a data time period of the half sine wave of FIG. 3.
Figure 5:
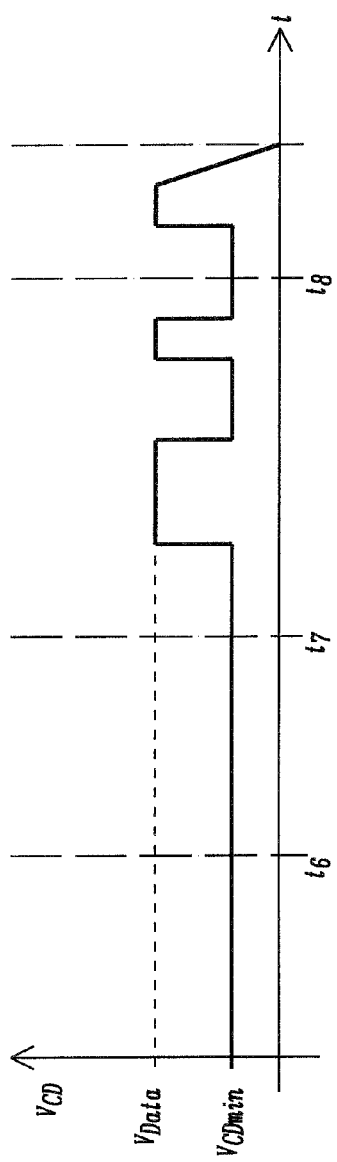
FIG. 5 is a plot of a data packet frame prior to modulation of the half sine wave applied to the input of the control gear during the data time period.

The capacitor $C_F$ provides a 40 kHz low-pass pole; which acts as the anti-alias filter for the ADC 115. ADC 115 in this implementation generates eight bits of data at a 3.8 μsec rate. The output of the ADC 115 is the eight bit sampled digital data providing the magnitude of the fractional voltage $V_{DIV}$ of the voltage $V_{CG}$ of the power supply mains 105. The sampled digital data is applied to a low pass SINC (cardinal sine function) filter 120 to remove noise and harmonics of the modulated carrier signal. In some embodiments of control gear including the data extraction circuitry of this disclosure, the lamp 55 of FIG. 2 is controlled by a switching power supply circuit that includes a flyback transformer. The switching power supply is a source for the noise and the voltage $V_{CG}$ of the power supply mains 105 includes the harmonics that are to be rejected.

The output 122 of the SINC filter 120 is transferred to a frame data detector 125. The frame data detector 125 demodulates the data packet frame from the large amplitude carrier voltage signal $V_{CG}$ and transfers the extracted data packet frame to the slice detector 130. The slice detector 130 reconstructs small amplitude data signal of the data packet frames from the output signal of the frame data detector 125. The output of the slice detector 130 is the slice data SLICE and the inverse of the slice data $\overline{SLICE}$.

The output 122 of the SING filter 120 is also transferred to a zero crossing detector 135 and a data period start detector 137. The zero crossing detector 135 determines the zero crossing time for the large amplitude carrier voltage signal $V_{CG}$ at the power supply mains 105. A zero crossing indicator ZC is active during the zero crossing period and provides a time marker for determining the timings during the data period of the large amplitude carrier voltage signal $V_{CG}$.

The frame data detector 125 also receives the zero crossing indicator ZC. The frame data detector 125 then determines the period start parameter START and the period stop parameter STOP. The period start parameter START is the number of periods before the zero crossing ZC that the sample window starts. And the period stop parameter STOP is the number of periods before the zero crossing ZC that the sample window stops. The period start parameter START and the period stop parameter STOP are specified from the next zero crossing ZC, however, the calculation is determined from the previous zero crossing ZC.

The slice data SLICE and the inverse of the slice data $\overline{SLICE}$ are the inputs to a period timer 140. The period timer 140 has a first counter 145 and a second counter 150 that are clocked by the faster system clock CLK that is a much faster counter clock than the basic frequency of the bi-phase encoded data of the data packet frames. In this implementation, the faster system clock CLK has a period of approximately 3.8 μsec. The first counter 145 receives the serially extracted slice data SLICE and detects, and counts the data of the first data level (digital "1"). The second counter 150 receives the serially extracted inverse slice data $\overline{SLICE}$ and detects, and counts the data of the second data level (digital "0").

The output of the first counter 145 is the inter-transition count 155 for each transition from a digital "0" to a digital "1" to the transition from a digital "1" to a digital "0". The output of the second counter 150 is the inter-transition count 160 for each transition from a digital "1" to a digital "0" to the transition from a digital "0" to a digital "1". The inter-transition counts 155 and 160 are the inputs to the valid data comparator 165. The valid data comparator 165 compares each serially received inter-transition count 155 and 160 with the valid data patterns that define the data structure of the data packet frames as shown in FIGS. 7b-7e. Each output 170, 172, . . . , 178 of the valid data comparator 165 indicates the which data pattern is valid in the series of the received data packet frame. Invalid data patterns are converted to reset signals 182 and 184. The valid data indicators 170, 172, . . . , 178 are the input to the data extractor 180. Each valid data indicators 170, 172, . . . , 178 shows the results of the comparison of the inter-transition counts 155 and 160 with the valid data patterns and indicates which valid data pattern is indicated by the valid data indicators 170, 172, . . . , 178. In this implementation, the valid data indicator 170 indicates that the inter-transition count is for digital "1" having a valid one-bit width (VALID 1_1). The valid data indicator 172 indicates that the inter-transition count is for digital "1" having a valid two-bit width (VALID 1_2). The valid data indicator 174 indicates that the inter-transition count is for digital "1" having a valid five-bit width or indicates the "start-of-telegram" (VALID 1_5). The valid data indicator 176 indicates that the inter-transition count is for digital "0" having a valid one-bit width (VALID 0_1). The valid data indicator 170 indicates that the inter-transition count is for digital "0" having a valid two-bit width (VALID 0_2).

The valid data comparator 165 determines the valid data pattern for each inter-transition count as shown in Table 1:

TABLE 1

| | VALID DATA | VALID DATA COUNT BOUNDARY | VALID DATA TIME PERIOD BOUNDARY | |
|---|---|---|---|---|
| 170 | Valid1_1 | 4 ≤ count1 ≤ 18 | 15.2 μs ≤ count1 ≤ 64.8 μs | '1'-1-bit wide |
| 172 | Valid1_2 | 19 ≤ count1 ≤ 32 | 72.2 μs ≤ count1 ≤ 121.6 μs | '1'-2-bit wide |
| 174 | Valid1_5 | 48 ≤ count1 ≤ 81 | 182.4 μs ≤ count1 ≤ 307.8 μs | '1'-5-bit wide |
| 176 | Valid0_1 | 4 ≤ count0 ≤ 18 | 15.2 μs ≤ count0 ≤ 64.8 μs | '0'-1-bit wide |
| 178 | Valid0_2 | 19 ≤ count0 ≤ 32 | 72.2 μs ≤ count0 ≤ 121.6 μs | '0'-2-bit wide |

The valid data boundary counts and valid data time period boundaries are determined empirically by a combination of inspection and simulation. A count range selected is a multiple of the fixed reference system clock CLK and is chosen such that the count range encompasses the specified minimum and maximum of the pulse widths. As long as there is a gap in the ranges between a single '0' and double '00' or a single '1' or a double "11", then a detection criteria ensures reliable communication.

The data extractor 180 is a state machine that follows a pre-determined sequence of steps for each of the possible data patterns for the five valid data packet frames of FIGS. 7b-7e. Pulse widths outside a defined range are treated as error conditions to eliminate false decodes. The state machine upon receiving the error condition sets the reset signals 182 and 184 that are transferred to the a first counter 145 and a second counter 150. The period timer then waits for the data period start indicator VSWI that signals the time when the power supply mains 5 voltage is less than the voltage level $V_{SW}$. At the occurrence of the activation of the data period start VSWI, the point the period timer examines the slice data SLICE and the inverse of the slice data $\overline{SLICE}$ to determine that a transition has occurred to start detecting the next data packet frame.

With the reception of a valid data packet frame, data extractor 180 transfers the extracted frame data 185 to the command formatter 190. The command formatter 190 repetitively receives the extracted frame data 185 and assembles the telegram in a telegram register 195. When the telegram register 195 is filled, the extracted telegram is transferred to the lamp controller 50 to adjust the function of the lamp 55.

FIGS. 10a-10e collectively form a flow chart for the function of a decoding apparatus for converting data packet frames to communication telegrams of the control gear embodying the principals of the present disclosure. Referring to FIG. 9 and FIGS. 10a-10e, the flow chart describes a state machine that encompasses the counters 145 and 150 of the period timer 140, the valid data comparator 165, and the data extractor 185 that includes the telegram register 195. The method starts (Box 200) with resetting the counters 145 and 150 of the period timer 140 (Box 205). The data period start indicator VSWI is examined (Box 210) to determine that the input slice data SLICE and the inverse of the input slice data $\overline{SLICE}$ is within the data period of the large amplitude carrier voltage signal $V_{CG}$ of the power supply mains 105. If the data period start indicator VSWI is not active, the counters 145 and 150 of the period timer 140 are reset (Box 205) and the data period start indicator VSWI is again examined (Box 210). This continues until the data period start indicator VSWI is activated.

A brief wait period is activated (Box 215) and at the end of the wait period (Box 215), the data output of the state machine is set (Box 220) to "none" indicating that no transition has been detected. The counters 145 and 150 of the period timer 140 are reset (Box 225) and the stop indicator is examined (Box 230) to determine that the data sampling period has expired and no data has been detected. An error is declared (Box 235) and the data output of the state machine is set (Box 240) to "none". The state machine proceeds to a wait-to-start state (Box 240) to await the arrival of the next data frame packet.

In the wait-to-start state (Box 240), the counters 145 and 150 of the period timer 140 are reset (Box 245) and the data period start indicator VSWI is again examined (Box 250) to determine that the input slice data SLICE and the inverse of the input slice data $\overline{SLICE}$ is within the data period of the large amplitude carrier voltage signal $V_{CG}$ of the power supply mains 105. If the input slice data SLICE and the inverse of the input slice data $\overline{SLICE}$ is not within the data period, the counters 145 and 150 of the period timer 140 are reset (Box 245) and the data period start indicator VSWI is again examined (Box 250) to determine that the input slice data SLICE and the inverse of the input slice data $\overline{SLICE}$ is within the data period. When the data period start indicator VSWI indicates that the input slice data SLICE and the inverse of the input slice data $\overline{SLICE}$ is within the data period, the start indicator START is examined (Box 255) to determine that the data sample window the large amplitude carrier voltage signal $V_{CG}$ of the power supply mains 105 has now reached the beginning of the data sample window. If the start indicator is not active to indicated that the sample window is not reached, the counters 145 and 150 of the period timer 140 are reset (Box 245), the data period start indicator VSWI is again examined (Box 250) to determine that the input slice data SLICE and the inverse of the input slice data $\overline{SLICE}$ is within the data period, and the start indicator START is examined (Box 255) to determine that the data period the large amplitude carrier voltage signal $V_{CG}$ has now reached the beginning of the sample window.

When the start indicator START indicates that the data period the large amplitude carrier voltage signal $V_{CG}$ has now reached the beginning of the sample window, the state machine activates (Box 215) the brief wait period. At the end of the wait period (Box 215), the data output of the state machine is set (Box 220) to "none" indicating that no transition has been detected. The counters 145 and 150 of the period timer 140 are reset (Box 225) and the stop indicator STOP is examined (Box 230) to determine that the data period has expired and no data has been detected. When the stop indicator STOP indicates that the data sample window has not been reached, the input slice data SLICE and the inverse of the input slice data $\overline{SLICE}$ is examined (Box 260) that it is set to the digital "0" to determine that an initial transition of the input slice data SLICE has occurred.

If the input slice data SLICE is at the digital "0", the state machine activates (Box 215) the brief wait period. At the end of the wait period (Box 215), the data output of the state machine is set (Box 220) to "none" indicating that no transition has been detected. The counters 145 and 150 of the period timer 140 are reset (Box 225) and the stop indicator STOP is examined (Box 230) to determine that the data period has expired and no data has been detected. When the stop indicator STOP indicates that the data sample window has not been reached, the input slice data SLICE and the inverse of the input slice data $\overline{SLICE}$ is examined (Box 260) to establish that it is set to the digital "0" to determine if an initial transition of the input slice data SLICE has occurred.

When the input slice data SLICE is not at the digital "0", the initial transition from the digital "0" to the digital "1" has occurred. The first counter 145 is incremented (Box 265) and the second counter 150 is reset (Box 270). The input slice data SLICE and the inverse of the input slice data $\overline{SLICE}$ are examined (Box 275) to determine that a next transition of the input slice data SLICE has occurred. If the next transition of the input slice data SLICE has not occurred, the first counter 145 is incremented (Box 265), the second counter 150 is reset (Box 270), and the input slice data SLICE and the inverse of the input slice data $\overline{SLICE}$ are examined (Box 275) to determine that a next transition of the input slice data SLICE has occurred.

When the next transition of the input slice data SLICE has occurred, the first counter is compared (Box 280) with the valid inter-transition time periods. The stop indicator STOP and the zero crossing indicator ZC are examined (Box 285) to determine if the data sample window has been passed or the large amplitude carrier voltage signal $V_{CG}$ of the power supply mains 105 has reached its zero crossing. If the data sample window has been passed or the large amplitude carrier voltage signal $V_{CG}$ of the power supply mains 105 has reached its zero crossing, a data error has occurred and the error is declared (Box 290) and the data output of the state machine is set (Box 295) to "error". The state machine returns to a "wait-to-start" state (Box 297) to await arrival of the next data frame packet.

When the data sample window has not been passed or the large amplitude carrier voltage signal $V_{CG}$ of the power supply mains 105 has not reached its zero crossing, the first counter 145 is examined (Box 300) to determine if its time period count for the digital "1" is less than the minimum count value for the 5-bit inter-transition period. If time period count for the digital "1" is not less than the minimum count value for the 5-bit inter-transition period, the first counter 145 is examined (Box 302) to determine if its time period count for the digital "1" is greater than the maximum count value for the 5-bit inter-transition period. If the time period count is greater than the maximum count value for the 5-bit inter-transition period, an error has occurred and an error is declared (Box 290) and the data output of the state machine is set (Box 295) to "error". The state machine returns to a "wait-to-start" state (Box 297) to await arrival of the next data frame packet.

When the time period count for the digital "1" is not greater than the maximum count value for the 5-bit inter-transition period, the first counter 145 is reset (Box 304) and the state machine waits (Box 306) for the packet frame end.

The stop indicator STOP is examined (Box 308) to determine that the sample data period has expired. If the stop indicator is not activated, an error has occurred and the error is declared (Box 290) and the data output of the state machine is set (Box 295) to "error". The state machine returns to a "wait-to-start" state (Box 297) to await arrival of the next data frame packet. If the stop indicator is activated, the output data of the state machine is set (Box 310) to indicate a "start-of-telegram" has been received and the state machine returns to a "wait-to-start" state (Box 297) to await arrival of the next data frame packet.

When the first counter 145 is examined (Box 300) to determine if its time period count for the digital "1" is less than the minimum count value for the 5-bit inter-transition period and found that the time period count is less than the minimum count value for the 5-bit inter-transition period, the first counter 145 is examined (Box 312) to determine if its time period count for the digital "1" is less than the minimum count value for the 1-bit inter-transition period. If the time period count is less than the minimum count value for the 1-bit inter-transition period, an error has occurred and an error is declared (Box 290) and the data output of the state machine is set (Box 295) to "error". The state machine returns to a "wait-to-start" state (Box 297) to await arrival of the next data frame packet.

When the time period count is greater than the minimum count value for the 1-bit inter-transition period, the first counter 145 is examined (Box 314) to determine if its time period count for the digital "1" is less than the maximum count value for the valid 1-bit inter-transition period. When the time period count of the first counter 145 is less than the maximum count value for the valid 1-bit inter-transition period, the second counter 150 is incremented (Box 316), the first counter 145 is reset (Box 318). The input slice data SLICE is examined (Box 320) to establish that it is set to the digital "1" to determine if a transition of the input slice data SLICE has occurred. If the transition from the digital "0" to the digital "1" has not occurred, the second counter 150 is incremented (Box 316), the first counter 145 is reset (Box 318). When the transition from the digital "0" to the digital "1" has occurred, the second counter 150 is compared (Box 322) to the inter-transition time period. The second counter 150 is examined (Box 324) to determine that the inter-transition time period is greater than the minimum single bit inter-transition time period and less than the maximum single bit inter-transition time period. If the inter-transition time period of the second counter 150 is less than the minimum single bit inter-transition time period or greater than the maximum single bit inter-transition time period, an error has occurred and an error is declared (Box 290) and the data output of the state machine is set (Box 295) to "error". The state machine returns to a "wait-to-start" state (Box 297) to await arrival of the next data frame packet.

When the inter-transition time period of the second counter 150 is greater than the minimum single bit inter-transition time period and less than the maximum single bit inter-transition time period, the transition from the digital "0" to the digital "1" has occurred. The first counter 145 is incremented (Box 326) and the second counter 150 is reset (Box 328). The input slice data SLICE and the inverse of the input slice data $\overline{SLICE}$ are examined (Box 330) to determine that a next transition of the input slice data SLICE has occurred. If the next transition of the input slice data SLICE has not occurred, the first counter 145 is incremented (Box 326), the second counter 150 is reset (Box 328), and the input slice data SLICE and the inverse of the input slice data $\overline{SLICE}$ are again examined (Box 330) to determine that a next transition of the input slice data SLICE has occurred.

When the next transition from the digital "1" to the digital "0" has occurred, the first counter 145 is examined (Box 334) to determine if the inter-transition period of the first counter 145 is less than the minimum single-bit inter-transition period. If the inter-transition time period of the first counter 145 is less than the minimum single bit inter-transition time period an error is declared (Box 290) and the data output of the state machine is set (Box 295) to "error". The state machine returns to a "wait-to-start" state (Box 297) to await arrival of the next data frame packet.

If the inter-transition time period of the first counter 145 is greater than the minimum single bit inter-transition time period, the inter-transition time of the first counter 145 is examined (Box 336) to determine if the inter-transition period of the first counter 145 is less than the maximum single-bit inter-transition period. If the inter-transition time of the first counter 145 is greater than the maximum single bit inter-transition period, the first counter 145 is examined (Box 338) to determine that the inter-transition time period is greater than the minimum two-bit inter-transition time period and less than the maximum two-bit inter-transition time period. If the inter-transition time period of the first counter 145 is less than the minimum single bit inter-transition time period or greater than the maximum two-bit inter-transition time period, an error has occurred and an error is declared (Box 290) and the data output of the state machine is set (Box 295) to "error". The state machine returns to a "wait-to-start" state (Box 297) to await arrival of the next data frame packet.

If the inter-transition time of the first counter 145 is between the minimum single bit inter-transition time period and the maximum two-bit inter-transition time period, the first counter 145 is reset (Box 340) and the state machine waits (Box 342) for the packet frame end. The stop indicator STOP is examined (Box 344) to determine that the sample data period has expired. If the stop indicator is not activated, an error has occurred and the error is declared (Box 290) and the data output of the state machine is set (Box 295) to "error". The state machine returns to a "wait-to-start" state (Box 297) to await arrival of the next data frame packet. If the stop indicator is activated, the output data of the state machine is set (Box 346) to a digital "10" and the state machine returns to a "wait-to-start" state (Box 297) to await arrival of the next data frame packet.

When the first counter 145 is examined (Box 336) to determine if the inter-transition period of the first counter 145 is less than the maximum single-bit inter-transition period and the inter-transition time of the first counter 145 is less than the maximum single bit inter-transition period, the second counter 150 is incremented (Box 400), the first counter 145 is reset (Box 405). The input slice data SLICE is examined (Box 410) to establish that it is set to the digital "1" to determine if a transition of the input slice data SLICE has occurred. If the transition from the digital "0" to the digital "1" has not occurred, the second counter 150 is incremented (Box 405), the first counter 145 is reset (Box 410). When the transition from the digital "0" to the digital "1" has occurred, the second counter 150 is compared (Box 415) to the inter-transition time period. The second counter 150 is examined (Box 420) to determine that the inter-transition time period is greater than the minimum single bit inter-transition time period and less than the maximum single bit inter-transition time period. If the inter-transition time period of the second counter 150 is less than the minimum single bit inter-transition time period or greater than the maximum single bit inter-transition time period, an error has occurred and an error is declared (Box 290) and the data output of the state machine is set (Box 295) to "error". The state machine returns to a "wait-to-start" state (Box 297) to await arrival of the next data frame packet.

When the inter-transition time period of the second counter 150 is greater than the minimum single bit inter-transition time period and less than the maximum single bit inter-transition time period, the transition from the digital "0" to the digital "1" has occurred. The first counter 145 is incremented (Box 425) and the second counter 150 is reset (Box 430). The input slice data SLICE and the inverse of the input slice data $\overline{SLICE}$ are examined (Box 435) to determine that a next transition of the input slice data SLICE has occurred. If the next transition of the input slice data SLICE has not occurred, the first counter 145 is incremented (Box 425), the second counter 150 is reset (Box 430), and the input slice data SLICE and the inverse of the input slice data $\overline{SLICE}$ are again examined (Box 435) to determine that a next transition of the input slice data SLICE has occurred.

When the next transition from the digital "1" to the digital "0" has occurred, the first counter 145 is compared (Box 440) with the valid inter-transition periods. The first counter 145 is then examined (Box 445) to determine if the inter-transition period of the first counter 145 is less than the minimum single-bit inter-transition period and greater than the maximum single-bit inter-transition period. If the inter-transition time period of the first counter 145 is less than the minimum single-bit inter-transition time period or greater than the maximum single-bit inter-transition time period, an error is declared (Box 290) and the data output of the state machine is set (Box 295) to "error". The state machine returns to a "wait-to-start" state (Box 297) to await arrival of the next data frame packet.

When the first counter 145 indicates that the inter-transition time period is greater than the minimum single-bit inter-transition time period and less than the maximum single-bit inter-transition time period, the first counter 145 is reset (Box 450) and the state machine waits (Box 455) for the packet frame end. The stop indicator STOP is examined (Box 460) to determine that the sample data period has expired. If the stop indicator is not activated, an error has occurred and the error is declared (Box 290) and the data output of the state machine is set (Box 295) to "error". The state machine returns to a "wait-to-start" state (Box 297) to await arrival of the next data frame packet. If the stop indicator is activated, the output data of the state machine is set (Box 465) to a digital "11" and the state machine returns to a "wait-to-start" state (Box 297) to await arrival of the next data frame packet.

Figure 10A:
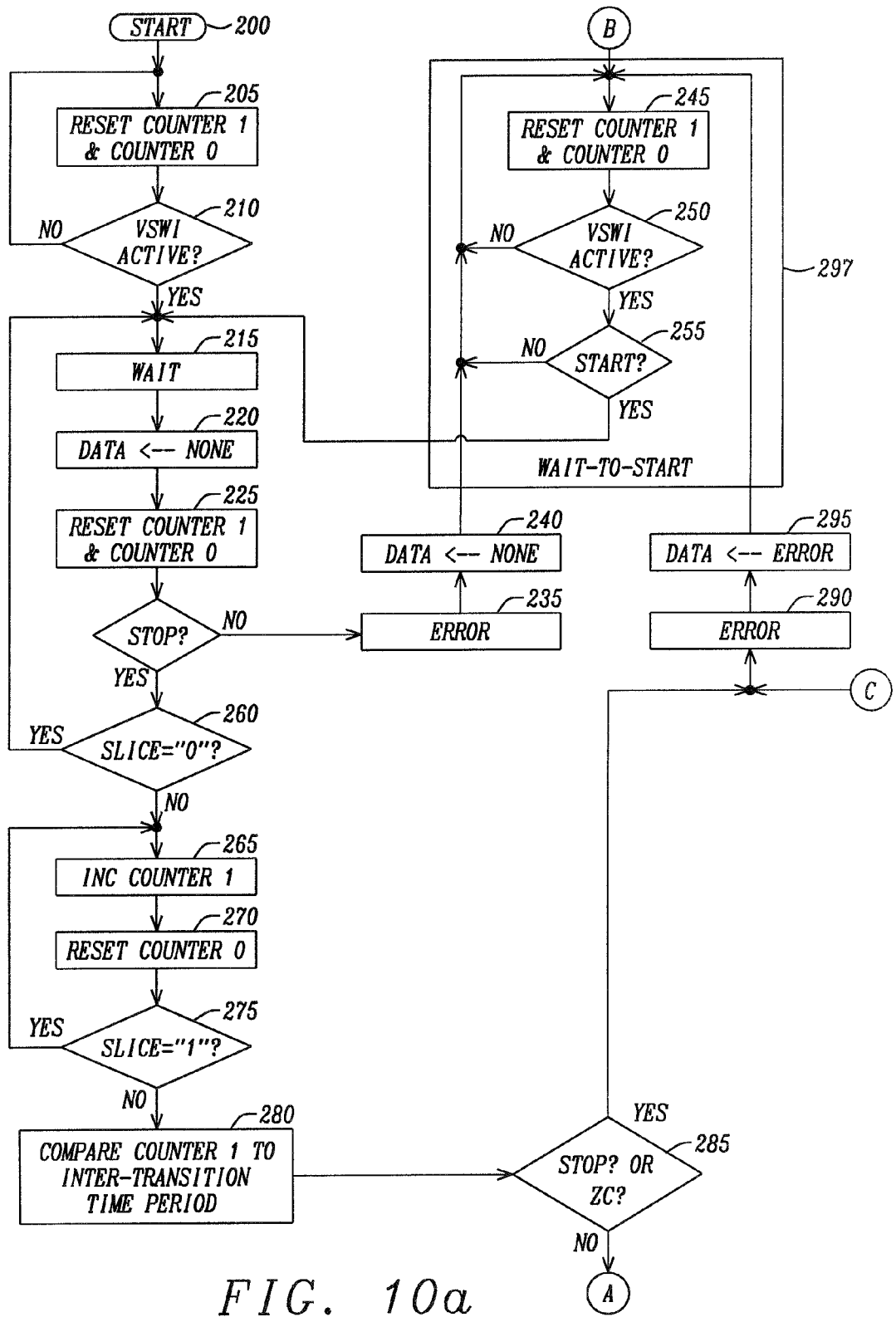
FIGS. 10*a*-10*f* collectively form a flow chart for the function of a decoding apparatus for converting data packet frames to communication telegrams of the control gear embodying the principals of the present disclosure.
Figure 10B:
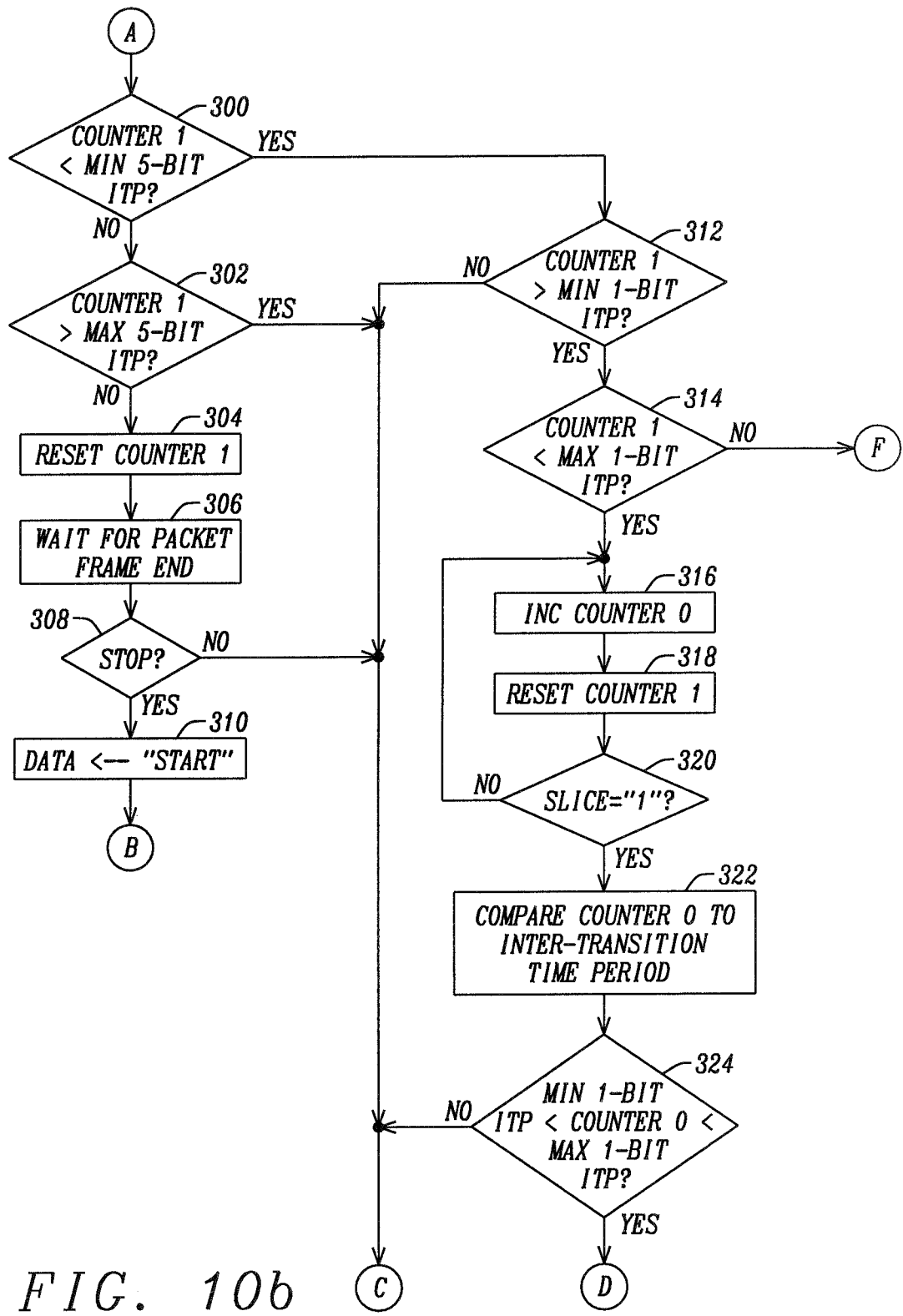
Figure 10C:
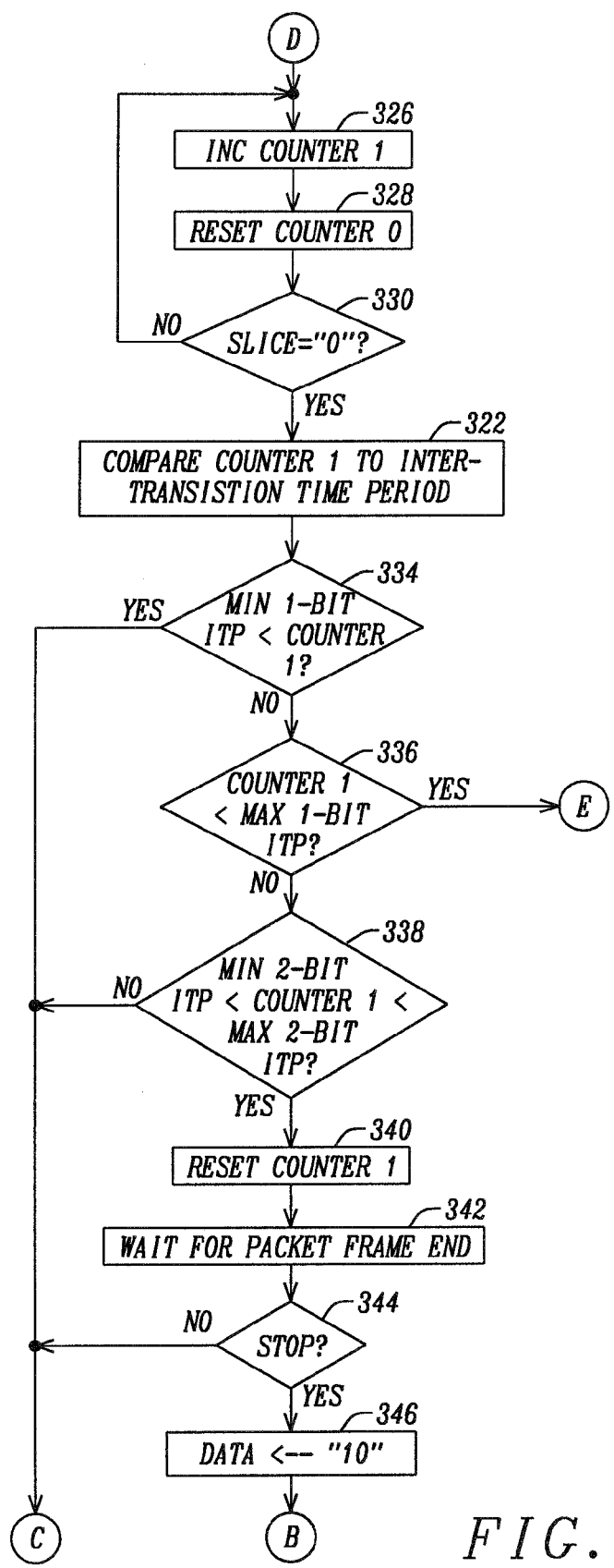
Figure 10D:
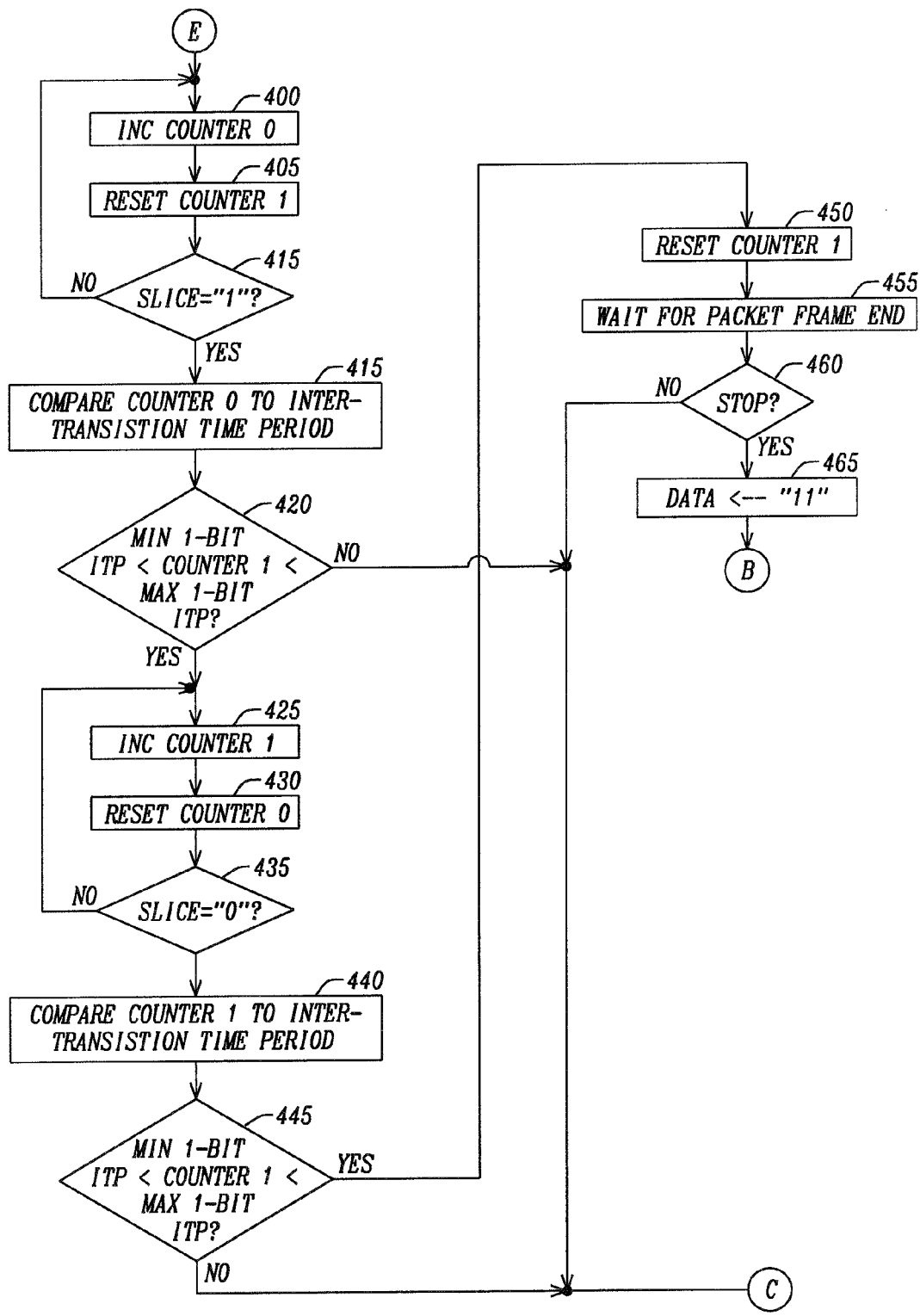
Figure 10E:
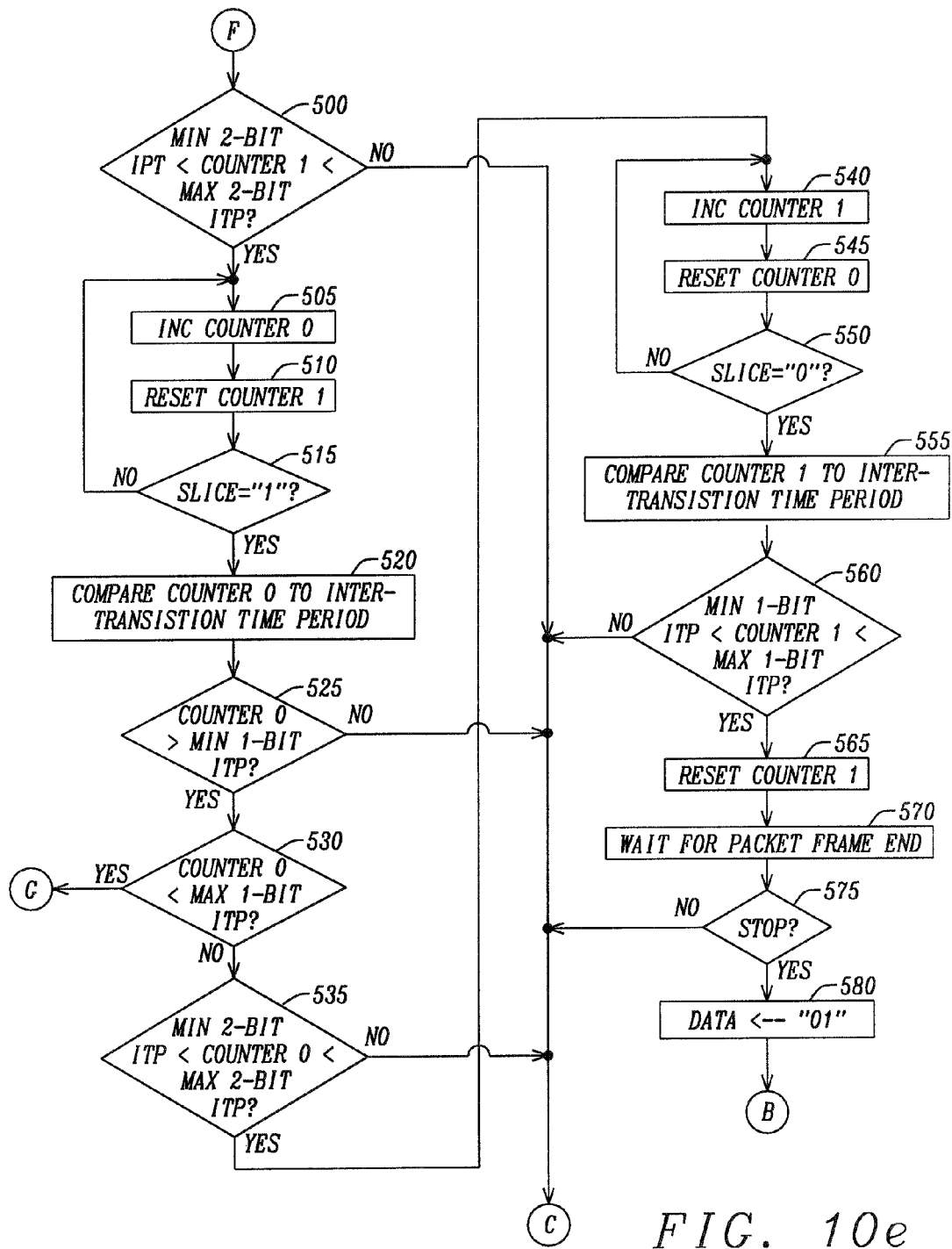

Returning to FIG. 10b, upon examining (Box 314) the first counter 145 is examined to determine if its time period count for the digital "1" is greater than the maximum count value for the valid 1-bit inter-transition period and the time period count of the first counter 145 is greater than the maximum count value for the valid 1-bit inter-transition period, the state machine branches to FIG. 10e. The first counter 145 is examined (Box 500) to determine that the inter-transition time period is greater than the minimum two-bit inter-transition time period and less than the maximum two-bit inter-transition time period. If the inter-transition time period of the first counter 145 is less than the minimum single bit inter-transition time period or greater than the maximum two-bit inter-transition time period, an error has occurred and an error is declared (Box 290) and the data output of the state machine is set (Box 295) to "error". The state machine returns to a "wait-to-start" state (Box 297) to await arrival of the next data frame packet.

If the inter-transition time of the first counter 145 is between the minimum single bit inter-transition time period and the maximum two-bit inter-transition time period, a valid transition from the digital "1" to the digital "0" has occurred and the second counter 150 is incremented (Box 505). The first counter 145 is then reset (Box 510) and the input slice data SLICE and the inverse of the input slice data $\overline{SLICE}$ are examined (Box 515) to determine that a next transition of the input slice data SLICE has occurred. If the next transition of the input slice data SLICE has not occurred, the second counter 150 is incremented (Box 505), the first counter 145 is then reset (Box 510), and the input slice data SLICE and the inverse of the input slice data $\overline{SLICE}$ are again examined (Box 515) to determine that a next transition of the input slice data SLICE has occurred.

When the next transition from the digital "0" to the digital "1" has occurred, the second counter 150 is compared (Box 520) with the valid inter-transition periods. The second counter 150 is then examined (Box 525) to determine if the inter-transition period of the second counter 150 is greater than the minimum 1-bit inter-transition period. If the inter-transition time period of the second counter 150 is not greater than the minimum 1-bit inter-transition time period, an error has occurred and an error is declared (Box 290) and the data output of the state machine is set (Box 295) to "error". The state machine returns to a "wait-to-start" state (Box 297) to await arrival of the next data frame packet.

If the inter-transition time period of the second counter 150 is greater than the minimum 1-bit inter-transition time period, the second counter 150 is examined (Box 530) to determine if the inter-transition time of the second counter 150 is less than the maximum 1-bit inter-transition period. If the inter-transition time period of the second counter 150 is not less than the maximum 1-bit inter-transition time period, the second counter 150 is examined (Box 535) to determine that the inter-transition time period is greater than the minimum 2-bit inter-transition time period and less than the maximum 2-bit inter-transition time period. If the inter-transition time period of the second counter 150 is less than the minimum single bit inter-transition time period or greater than the maximum two-bit inter-transition time period, an error has occurred and an error is declared (Box 290) and the data output of the state machine is set (Box 295) to "error". The state machine returns to a "wait-to-start" state (Box 297) to await arrival of the next data frame packet.

When the inter-transition time of the second counter 150 is between the minimum 2-bit inter-transition time period and the maximum 2-bit inter-transition time period, the first counter 145 is then incremented (Box 540) and second counter 150 is then reset (Box 545). The input slice data SLICE and the inverse of the input slice data $\overline{SLICE}$ are examined (Box 550) to determine that a next transition of the input slice data SLICE has occurred. If the next transition of the input slice data SLICE has not occurred, the first counter 145 is incremented (Box 545), the second counter 150 is then reset (Box 545), and the input slice data SLICE and the inverse of the input slice data $\overline{SLICE}$ are again examined (Box 550) to determine that a next transition of the input slice data SLICE has occurred.

When the next transition from the digital "1" to the digital "0" has occurred, the first counter 145 is compared (Box 555) with the valid inter-transition periods. The first counter 145 is then examined (Box 560) to determine if the inter-transition period of the first counter 145 is greater than the minimum 1-bit inter-transition period and less than the maximum 1-bit inter-transition time period. If the inter-transition time period of the period counter 145 is not greater than the minimum 1-bit inter-transition time period, an error has occurred and an error is declared (Box 290) and the data output of the state machine is set (Box 295) to "error". The state machine returns to a "wait-to-start" state (Box 297) to await arrival of the next data frame packet.

When the first counter 145 indicates that the inter-transition time period is greater than the minimum single-bit inter-transition time period and less than the maximum single-bit inter-transition time period, the first counter 145 is reset (Box 565) and the state machine waits (Box 570) for the packet frame end. The stop indicator STOP is examined (Box 575) to determine that the sample data period has expired. If the stop indicator is not activated, an error has occurred and the error is declared (Box 290) and the data output of the state machine is set (Box 295) to "error". The state machine returns to a "wait-to-start" state (Box 297) to await arrival of the next data frame packet. When the stop indicator is activated, the output data of the state machine is set (Box 580) to a digital "01" and the state machine returns to a "wait-to-start" state (Box 297) to await arrival of the next data frame packet.

Figure 10F:
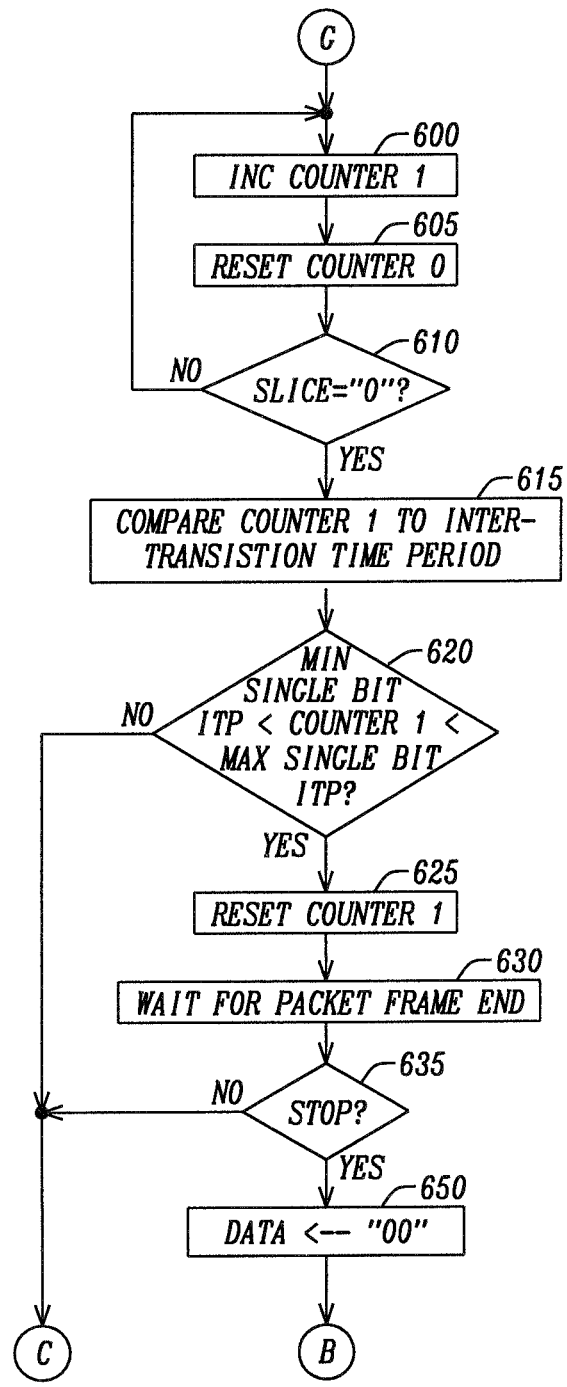

When the second counter is compared (Box 520) and examination (Box 535) of the second counter 150 indicates that the inter-transition time of the second counter is less than the maximum 1-bit inter-transition time, the state machine branches to FIG. 10f. The first counter 145 is incremented (Box 600) and the second counter 150 is reset (Box 605). The input slice data SLICE and the inverse of the input slice data $\overline{\text{SLICE}}$ are examined (Box 610) to determine that a next transition of the input slice data SLICE has occurred. If the next transition of the input slice data SLICE has not occurred, the first counter 145 is incremented (Box 600), the second counter 150 is then reset (Box 605), and the input slice data SLICE and the inverse of the input slice data $\overline{\text{SLICE}}$ are again examined (Box 610) to determine that a next transition of the input slice data SLICE has occurred.

When the next transition from the digital "1" to the digital "0" has occurred, the first counter 145 is compared (Box 615) with the valid inter-transition periods. The first counter 145 is then examined (Box 620) to determine if the inter-transition period of the first counter 145 is greater than the minimum 1-bit inter-transition period and less than the maximum 1-bit inter-transition time period. If the inter-transition time period of the period counter 145 is not greater than the minimum 1-bit inter-transition time period of less than the maximum 1-bit inter-transition time period, an error has occurred and an error is declared (Box 290) and the data output of the state machine is set (Box 295) to "error". The state machine returns to a "wait-to-start" state (Box 297) to await arrival of the next data frame packet.

When the first counter 145 indicates that the inter-transition time period is greater than the minimum single-bit inter-transition time period and less than the maximum single-bit inter-transition time period, the first counter 145 is reset (Box 625) and the state machine waits (Box 630) for the packet frame end. The stop indicator STOP is examined (Box 635) to determine that the sample data period has expired. If the stop indicator is not activated, an error has occurred and the error is declared (Box 290) and the data output of the state machine is set (Box 295) to "error". The state machine returns to a "wait-to-start" state (Box 297) to await arrival of the next data frame packet. When the stop indicator is activated, the output data of the state machine is set (Box 650) to a digital "00" and the state machine returns to a "wait-to-start" state (Box 297) to await arrival of the next data frame packet.

Figure 11:
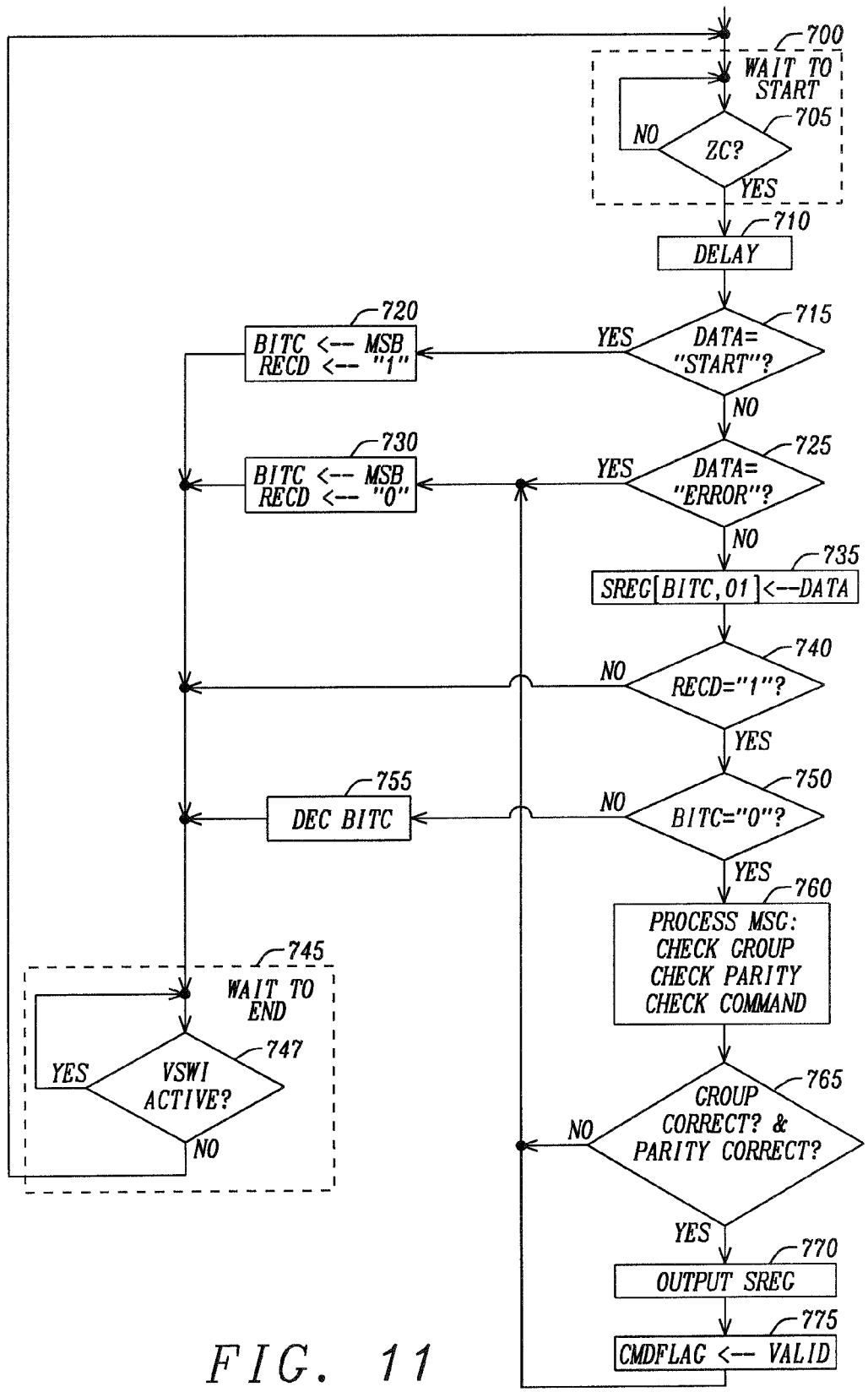
FIG. 11 is a flow chart for the function of a data extractor of the control gear embodying the principals of the present disclosure.

FIG. 11 is a flow chart for the function performed by a data extractor 180 of the control gear shown in FIG. 9, embodying the principals of the present disclosure. The function begins with a wait-to-start state (Box 700). In wait-to-start state (Box 700), the zero crossing indicator ZC is examined (Box 705) to determine if the zero crossing indicator ZC is active and the large amplitude carrier voltage signal $V_{CG}$ is within the zero crossing period to provide a time marker for determining the timings during the data period. When the zero crossing indicator ZC is not active, the function returns to the examining (Box 705) of the zero crossing indicator ZC and cycles this way until the zero crossing indicator ZC is active. When the zero crossing indicator ZC indicates that the large amplitude carrier voltage signal $V_{CG}$ is within the zero crossing period, a delay period is initiated (Box 710). In various embodiments, the delay period is approximately two clock cycles. At the expiration of the delay period, the extracted frame data 185 of the data extractor 180 is examined (Box 715) to determine if a "start-of-telegram" frame is received. If the "start-of-telegram" is not received, the extracted frame data 185 of the data extractor 180 is examined (Box 725) to determine if an "error" has been detected. If no "error" is detected, the extracted frame data 185 is transferred (Box 735) to the telegram register 190 at the location pointed to by a bit counter BITC. A received data flag RECD is examined (Box 740) to determine if the valid data has been received. If the data flag RECD is active, the extracted frame data 185 is valid and then the bit counter BITC is examined (Box 750) to determine if the telegram register 190 is filled. If the telegram register 190 is filled, the command telegram assembled in the telegram register 195 is checked (Box 760) that the group destination is correct, the parity of the command telegram is correct, and the command to be process is valid. The results of the check (Box 760) are examined (Box 765) to determine that the group destination is correct, the parity of the command telegram is correct, and the command to be process is valid. If the results of the check (Box 760) are correct and valid, the command telegram assembled in the telegram register 195 is transferred to the lamp controller 50 and a command valid flag is set to a valid state indicating that the valid command telegram is available to the lamp controller 50.

When the extracted frame data 185 of the data extractor 180 is examined (Box 715) and the "start-of-telegram" frame is received, the bit counter BITC is set (Box 720) to the most significant bit MSB of the telegram register 195 and the data flag RECD is set (Box 720) to be active ("1"). The command formatter 190 proceeds (Box 745) to a wait-to-end state. In the wait-to-end state, the data period start indicator VSWI is examined (Box 747) to determine that the large amplitude carrier voltage signal $V_{CG}$ of the power supply mains 105 is within the data period. As long as the data period start indicator VSWI indicates that the large amplitude carrier voltage signal $V_{CG}$ of the power supply mains 105 is within the data period, the data period start indicator VSWI is examined (Box 747) to determine its state. When the data period start indicator VSWI is no longer active, the command formatter 190 proceeds to the wait-to-start (Box 700) to wait for the next extracted frame data 185.

When the extracted frame data 185 of the data extractor 180 is examined (Box 725) and an "error" has been detected, the bit counter BITC is set (Box 730) to the most significant bit MSB of the telegram register 195 and the data flag RECD is set (Box 730) to be inactive ("0"). The command formatter 190 proceeds (Box 745) to the wait-to-end state.

When the received data flag RECD is examined (Box 740) and the data flag RECD is inactive, the command formatter 190 proceeds (Box 745) to a wait-to-end state.

When the bit counter BITC is examined (Box 750) and the telegram register 190 is not filled, the bit counter is decremented (Box 755). The command formatter 190 then proceeds (Box 745) to a wait-to-end state When the results of the check (Box 760) are examined (Box 765) and the results of the check (Box 760) are incorrect and invalid, the bit counter BITC is set (Box 730) to the most significant bit MSB of the telegram register 195 and the data flag RECD is set (Box 730) to be inactive ("0"). The command formatter 190 proceeds (Box 745) to a wait-to-end state.

In the normal operation, the command formatter 190 waits for the zero crossing of the large amplitude carrier voltage signal $V_{CG}$ and waits for the start-of-telegram signal in the extracted frame data 185. Upon receipt of the start-of-telegram, the bit counter BITC is set (Box 720) to the most significant bit MSB of the telegram register 195 and the data flag RECD is set (Box 720) to be active ("1"). The command formatter 190 then proceeds to the wait-to-end state (Box 745) until the data period start indicator VSWI is active. Then the command formatter 190 then proceeds to the wait-to-start state 700. The next extracted frame data 185 and assigned (Box 735) to the locations in the telegram register 195 pointed to by the bit counter BITC and the bit counter BITC is decremented (Box 755) and the process is continued until the bit counter BITC is decremented to zero. The command telegram assembled in the telegram register 195 is checked (Box 760) that the group destination is correct, the parity of the command telegram is correct, and the command to be process is valid. If the results of the check (Box 760) are correct and valid, the command telegram assembled in the telegram register 195 is transferred to the lamp controller 50 and a command valid flag is set to a valid state indicating that the valid command telegram is available to the lamp controller 50 and the function of the control gear is complete until an new command is to be issued.

Figure 12:
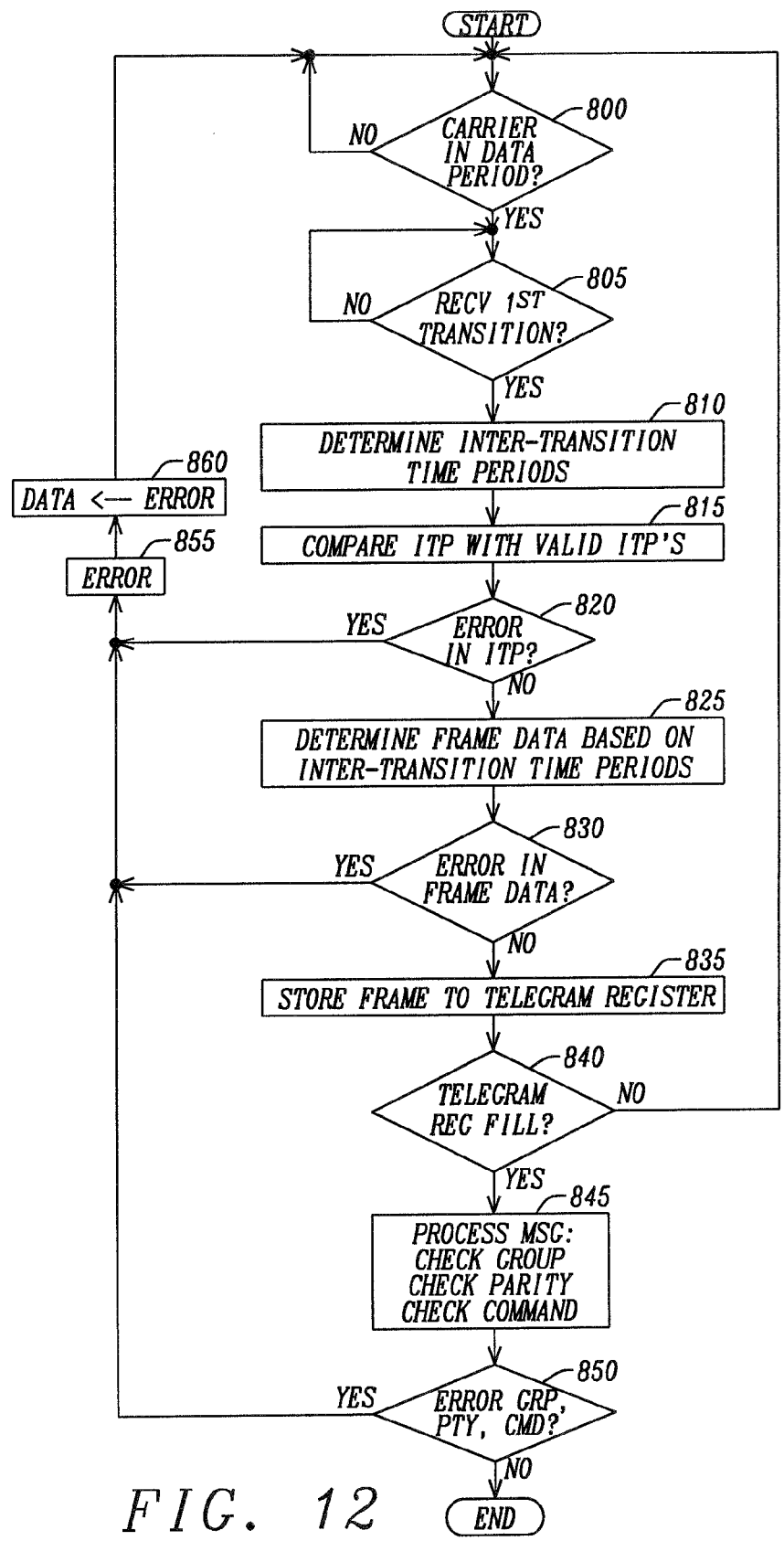
FIG. 12 is a flow chart for a computer executable program process for decoding of data packet frames to form communication telegrams embodying the principals of the present disclosure.

FIG. 12 is a flow chart for a computer executable program process for decoding of data packet frames to form communication telegrams embodying the principals of the present disclosure. A non-transitory medium that is readable by a computer processor has a program of instructions stored on it that are executable by the computer processor for a method for determining a telegram bit data pattern from multiple data packet frames containing bi-phase encoded data to generate data for subsequent processing. The method is started by determining (Box 800) that the large amplitude carrier voltage signal $V_{CG}$ of the power supply mains 105 is in the data period. When the large amplitude carrier voltage signal $V_{CG}$ is not in the data period, the determining (Box 800) that the large amplitude carrier voltage signal $V_{CG}$ is in the data period each cycle of the system clocking system. When the large amplitude carrier voltage signal $V_{CG}$ is in the data period, the extracted data packet is examined (Box 805) to determine if the $1^{st}$ transition has occurred. When the large amplitude carrier voltage signal $V_{CG}$ is not in the data period, the examining (Box 805) to determine if the first transition has occurred during each cycle of the system clocking system. When the first transition occurs, each transition is tracked and the inter-transition time period for each transition is determined (Box 810) and the inter-transition time periods between each of the transitions during the data periods are compared (Box 815) with valid inter-transitions ITP. The inter-transition time periods are examined (Box 820) for errors. If there are no errors, the frame data is determined (Box 825) based on inter-transition time periods. The frame data is examined (Box 830) for errors. If the there are no errors, the frame data is stored (Box 840) to a telegram register. The telegram register is tested (Box 840) to determine if it is full. If the telegram register is not filled, the process is repeated until the register is filled. When telegram register is filled, the telegram message is processed to determine that the group, parity, and command are correct. It is determined (Box 850) if there are any group errors, parity errors, or command errors. If there are no group errors, parity errors, or command errors, the method is ended.

If there are errors in the inter-transition periods, the frame data, the group errors, parity, or command, an error is declared (Box 855) and the frame data is assigned (Box 860) an error symbol. The process is then returned to the beginning awaiting the arrival of the next data period.

While this disclosure has been particularly shown and described with reference to the preferred embodiments thereof, it will be understood by those skilled in the art that various changes in form and details may be made without departing from the spirit and scope of the disclosure.

What is claimed is:

1. A decoding circuit configured for assembling telegram data patterns from multiple encoded digital data frames demodulated from a low frequency, large amplitude carrier signal modulated with higher frequency, multiple encoded digital data frames, the decoding circuit comprising:
   a period timer to establish an inter-transition time period between each transition within each of the multiple encoded digital data frames wherein, the inter-transition time period is the time between each transition of the encoded digital data frames between a first data level and a second data level and between the second data level and the first data level;
   an inter-transition comparator in communication with the period timer and configured to compare each of the inter-transition time periods with valid inter-transition time periods between each transition of the encoded digital data frames for determining when the inter-transition time periods represent valid data frame patterns or are an error;
   a data extractor configured to receive valid encoded digital data frames from the inter-transition comparator for extracting transmitted digital data frames from within the valid data encoded digital data frames; and
   a command formatter configured to receive the extracted digital data frames from the data extractor for assembling the telegram data patterns for transfer for subsequent processing.

2. The decoding circuit of claim 1 wherein the period timer comprises a first counter and a second counter, wherein the first and second counters receive a faster counter clock than a basic frequency of the encoded digital data frames such that each of the first and second counters determines an accurate representation of the inter-transition time periods.

3. The decoding circuit of claim 2 wherein the first counter receives each of the extracted encoded digital data frames, detects, and counts the data of the first data level, and the second counter receives each of the extracted encoded digital data frames, detects, and counts the data of the second data level.

4. The decoding circuit of claim 2 wherein each inter-transition time period transmitted to the inter-transition comparator is compared with maximum and minimum transition time periods to determine a data bit pattern contained in each of the extracted encoded digital data frames.

5. The decoding circuit of claim 4 wherein each telegram data pattern has unique inter-transition time periods that the inter-transition comparator uses to determine a valid data frame pattern for each of the extracted encoded digital data frames decoded.

6. The decoding circuit of claim 4 wherein the inter-transition comparator is programmed with the maximum and minimum transition time periods for each of the valid data frame patterns.

7. The decoding circuit of claim 4 wherein when the received inter-transition time periods fall outside the maximum or minimum transition counts, the inter-transition comparator declares an error and the decoding circuit awaits a start of a new telegram data pattern.

8. The decoding circuit of claim 1 wherein the data extractor decodes the valid encoded digital data frames to extract the telegram data pattern based on a sequence of expected valid bit patterns.

9. The decoding circuit of claim 8 wherein when the data extractor receives an invalid bit pattern an error is declared and the decoding circuit awaits a start of a new telegram data pattern.

10. The decoding circuit of claim 1 wherein the command formatter assembles the telegram data pattern by receiving a "start-of-telegram" symbol that indicates that a series of encoded digital data frames are being transmitted to communicate the telegram data pattern.

11. The decoding circuit of claim 1 wherein the command formatter initializes a telegram register and at the reception of each of the subsequent telegram data, the command formatter places each of the telegram data patterns in the telegram register.

12. The decoding circuit of claim 11 wherein when the telegram register is loaded, the command formatter determines that there are no framing errors, length errors, or parity errors and then transfer the telegram from the telegram register for subsequent processing.

13. The decoding circuit of claim 12 wherein when there are framing errors, length errors, or parity errors, the command formatter declares an error and the decoding circuit a start of a new telegram data pattern.

14. A method for determining telegram data patterns from multiple data packet frames containing valid bi-phase encoded data for subsequent processing, comprising the steps of:
a) determining that a data transition from a first data level to a second data level and between the second data level and the first data level has arrived;
b) determining inter-transition time periods between all the transitions between the first data level and the second data level of each of the multiple data packet frames;
c) comparing each of the inter-transition time periods with valid inter-transition time periods to determine a valid bi-phase encoded data is contained in each of the multiple data packet frames;
d) extracting the telegram data pattern from valid bi-phase encoded data based on a sequence of expected valid bit patterns;
e) determining if an invalid telegram data pattern has been extracted;

f) when an invalid telegram data pattern is determined, declaring an error and awaiting a start of new multiple data packet frames;
g) when the telegram data pattern is determined to be valid, placing the telegram data pattern in a telegram register;
h) repeating steps a) through g) until the telegram register is filled.

15. The method for determining the telegram data pattern of claim 14 further comprising the step of examining the telegram data pattern resident in the telegram register for determining that there are no framing errors, length errors, or parity errors.

16. The method for determining the telegram data pattern of claim 15 further comprising the step of transferring the data resident in the telegram register to associated circuitry for execution of a command indicated by the telegram data pattern, when there are no framing errors, length errors, or parity errors.

17. The method for determining the telegram data pattern of claim 16 further comprising the steps of declaring an error and awaiting a start of a new telegram data pattern, when there are framing errors, length errors, or parity errors.

18. A digital load side transmission lighting control apparatus comprising:
at least one control gear for controlling at least one lighting source and configured for extracting a telegram data pattern from multiple valid encoded digital data frames demodulated from an alternating current (AC), mains voltage modulated with higher frequency multiple encoded digital data frames, the control gear comprising:
a period timer to establish an inter-transition time period between each transition within each of the multiple valid encoded digital data frames wherein, the inter-transition time period is the time between transitions of the valid encoded digital data frames between a first data level to a second data level and between the second data level and the first data level,
an inter-transition comparator in communication with the period timer and configured to compare each of the inter-transition time periods with valid inter-transition time periods for the valid encoded digital data frames for determining when the inter-transition time periods represent valid patterns or are an error;
a data extractor configured to receive the valid encoded digital data frames from the inter-transition comparator for extracting the telegram data pattern from within the valid encoded digital data frames, and
a command formatter configured to receive the extracted telegram data pattern from the data extractor for assembling the telegram data patterns for transfer for subsequent processing.

19. The digital load side transmission lighting control apparatus of claim 18 wherein the period timer comprises a first counter and a second counter, wherein the first and second counters receive a faster counter clock than a basic frequency of the encoded digital data frames such that the each of the first and second counters determines an accurate representation of the inter-transition time periods.

20. The digital load side transmission lighting control apparatus of claim 19 wherein the first counter receives each encoded digital data frame, detects, and counts the data of the first data level, and the second counter receives each encoded digital data frame, detects, and counts the data of the second data level.

21. The digital load side transmission lighting control apparatus of claim 18 wherein each inter-transition time period transmitted to the inter-transition comparator is compared with maximum and minimum transition time periods to determine a data bit pattern contained in each of the extracted digital data frames.

22. The digital load side transmission lighting control apparatus of claim 21 wherein each telegram data pattern has unique inter-transition time periods that the inter-transition comparator uses to determine a valid data frame pattern for each of the extracted digital data frames decoded.

23. The digital load side transmission lighting control apparatus of claim 21 wherein the inter-transition comparator is programmed with the maximum and minimum transition time periods for each of the valid data frame patterns.

24. The digital load side transmission lighting control apparatus of claim 21 wherein when the received inter-transition time period falls outside the maximum or minimum transition counts, the inter-transition comparator declares an error and the at least one control gear awaits a start of a new telegram data pattern.

25. The digital load side transmission lighting control apparatus of claim 18 wherein the data extractor decodes the encoded digital data frame to extract the telegram data pattern based on a sequence of expected valid bit patterns.

26. The digital load side transmission lighting control apparatus of claim 25 wherein when the data extractor receives an invalid bit pattern an error is declared and at least one control gear awaits a start of a new telegram data pattern.

27. The digital load side transmission lighting control apparatus of claim 18 wherein the command formatter assembles the telegram data by receiving a "start-of-telegram" symbol that indicates that a series of data packet frames are being transmitted to communicate the telegram data pattern.

28. The digital load side transmission lighting control apparatus of claim 18 wherein the command formatter initializes a telegram register and at the reception of the telegram data pattern, the command formatter places the telegram data pattern in the telegram register.

29. The digital load side transmission lighting control apparatus of claim 28 wherein when the telegram register is loaded, the command formatter determines that there are no framing errors, length errors, or parity errors and then transfer the telegram data patterns from the telegram register for subsequent processing.

30. The digital load side transmission lighting control apparatus of claim 29 wherein when there are framing errors, length errors, or parity errors, the command formatter declares an error and the at least one control gear awaits a start of a new telegram data pattern.

31. A non-transitory medium that is readable by a computer processor having a program of instructions stored on it that are executable by the computer processor to perform a method for determining telegram data from multiple data packet frames containing valid bi-phase encoded data for subsequent processing, wherein the computer executable method comprises the steps of:
  a) determining data transitions from a first data level to a second data level and from the second data level to the first data level has arrived;
  b) determining inter-transition time periods between all the transitions between the first data level and the second data level of each of the multiple data packet frames;
  c) comparing each of the inter-transition time periods with valid inter-transition time periods to determine whether a valid bi-phase encoded data is contained in each of the multiple data packet frames;
  d) extracting the telegram data pattern from the valid bi-phase encoded frame data based on a sequence of expected valid bit patterns;
  e) determining if an invalid telegram data pattern has been extracted;
  f) when an invalid telegram data pattern is determined, declaring an error and awaiting a start of a new telegram data pattern;
  g) when the telegram data pattern is determined to be valid, placing the telegram data pattern in a telegram register;
  h) repeating steps a) through g) until the telegram register is filled.

32. The non-transitory medium of claim 31 wherein the method for determining telegram data pattern further comprises the step of examining the telegram data pattern resident in the telegram register for determining that there are no framing errors, length errors, or parity errors.

33. The non-transitory medium of claim 32 wherein the method for determining telegram data pattern further comprises the step of transferring the data resident in the telegram register to associated circuitry for execution of a command indicated by the telegram data pattern, when there are no framing errors, length errors, or parity errors.

34. The non-transitory medium of claim 33 wherein the method for determining telegram data pattern further comprises the step of declaring an error and awaiting a start of a new telegram data pattern, when there are framing errors, length errors, or parity errors.

* * * * *